(12) United States Patent
Eda et al.

(10) Patent No.: US 7,188,700 B2
(45) Date of Patent: Mar. 13, 2007

(54) ELECTRIC POWER STEERING APPARATUS

(75) Inventors: Hiroshi Eda, Gunma-ken (JP); Toru Segawa, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/402,006

(22) Filed: Apr. 12, 2006

(65) Prior Publication Data

US 2006/0191738 A1    Aug. 31, 2006

Related U.S. Application Data

(63) Continuation of application No. 10/491,564, filed as application No. PCT/JP02/12651 on Dec. 3, 2002, now Pat. No. 7,077,235.

(30) Foreign Application Priority Data

| Dec. 3, 2001 | (JP) | 2001-368886 |
| Mar. 20, 2002 | (JP) | 2002-078511 |
| Mar. 20, 2002 | (JP) | 2002-079215 |
| Jun. 13, 2002 | (JP) | 2002-173096 |

(51) Int. Cl.
    *B62D 5/04* (2006.01)

(52) U.S. Cl. .................... 180/444; 74/388 PS

(58) Field of Classification Search ............. 180/444, 180/443; 74/388 PS
    See application file for complete search history.

(56) References Cited

U.S. PATENT DOCUMENTS 5,044,454 A    9/1991  Kanazawa et al. ......... 180/79.1

6,044,723 A    4/2000  Eda et al.
6,357,313 B1   3/2002  Appleyard .................... 74/388

(Continued)

FOREIGN PATENT DOCUMENTS

DE    198 22 478 A1    12/1998

(Continued)

OTHER PUBLICATIONS

Backhaus, Von Richard, "Die Servolectric von Z," ISSN: 0001-2785/XP-000780494, pp. 636-638.

(Continued)

*Primary Examiner*—Tony Winner
(74) *Attorney, Agent, or Firm*—Miles & Stockbridge PC

(57) ABSTRACT

Provided is an electric power steering apparatus comprising a housing, a motor attached to this housing and transmitting an auxiliary steering force to a rotary shaft through a motor shaft, a worm formed on or fitted on the rotary shaft and having a gear portion formed of a metal or a resin, rolling bearings provided in the housing, disposed respectively in positions on both sides of the worm and rotatably supporting the rotary shaft, an output shaft transmitting a steering force for steering an axle and rotatably supported in a predetermined position of the housing, and a worm wheel formed on or fitted on the output shaft in a way that meshes with the worm and having a gear portion formed of the resin, wherein a pre-load mechanism for applying a pre-load acting towards the worm wheel is provided at a shaft end portion, distal from the motor, of the rotary shaft. The thus simply-constructed electric power steering apparatus is capable of eliminating an existence of a backlash and reducing tooth-butting noises without any decline of a power transmitting performance.

4 Claims, 17 Drawing Sheets

U.S. PATENT DOCUMENTS

| | | | |
|---|---|---|---|
| 6,708,796 B2 | 3/2004 | Kinme et al. | 180/444 |
| 6,761,244 B2 | 7/2004 | Sano et al. | 180/444 |
| 6,763,738 B1 | 7/2004 | Tsutsui et al. | 74/388 |
| 2001/0040067 A1 | 11/2001 | Murakami et al. | |
| 2002/0017420 A1 | 2/2002 | Kinme et al. | 180/444 |
| 2002/0096005 A1 | 7/2002 | Oka et al. | |
| 2002/0121401 A1 | 9/2002 | Shimizu et al. | 180/444 |
| 2004/0029671 A1 | 2/2004 | Bock et al. | 475/18 |

FOREIGN PATENT DOCUMENTS

| | | |
|---|---|---|
| DE | 2327652 A | 2/1999 |
| DE | 101 22 434 A1 | 11/2001 |
| DE | 101 23 767 | 11/2001 |
| EP | 1065132 A | 1/2001 |
| FR | 2808759 A | 11/2001 |
| JP | UM 63-46281 | 3/1988 |
| JP | 03-112784 | 5/1991 |
| JP | 10-281235 | 10/1998 |
| JP | 11-43062 A | 2/1999 |
| JP | 11-308805 | 11/1999 |
| JP | 2000-43739 | 2/2000 |
| JP | 2001-10512 A | 1/2001 |
| JP | 2001-108025 | 4/2001 |
| JP | 2001-233224 | 8/2001 |
| JP | 2001-233225 A | 8/2001 |
| JP | 2001-270448 | 10/2001 |
| JP | 2001-315653 | 11/2001 |
| JP | 2001-322554 A | 11/2001 |
| JP | 2002-21943 | 1/2002 |
| JP | 2002-29434 | 1/2002 |
| JP | 2002-37094 | 2/2002 |
| JP | 2002-098198 | 4/2002 |
| JP | 2002-266987 | 9/2002 |
| JP | 2002-323059 | 11/2002 |
| WO | WO 99/65758 | 12/1999 |

OTHER PUBLICATIONS

The Nikkan Kogyo Shinbun Ltd., "Gears", vol. 5, pp. 1704-1705, 1959, (with partial translation).

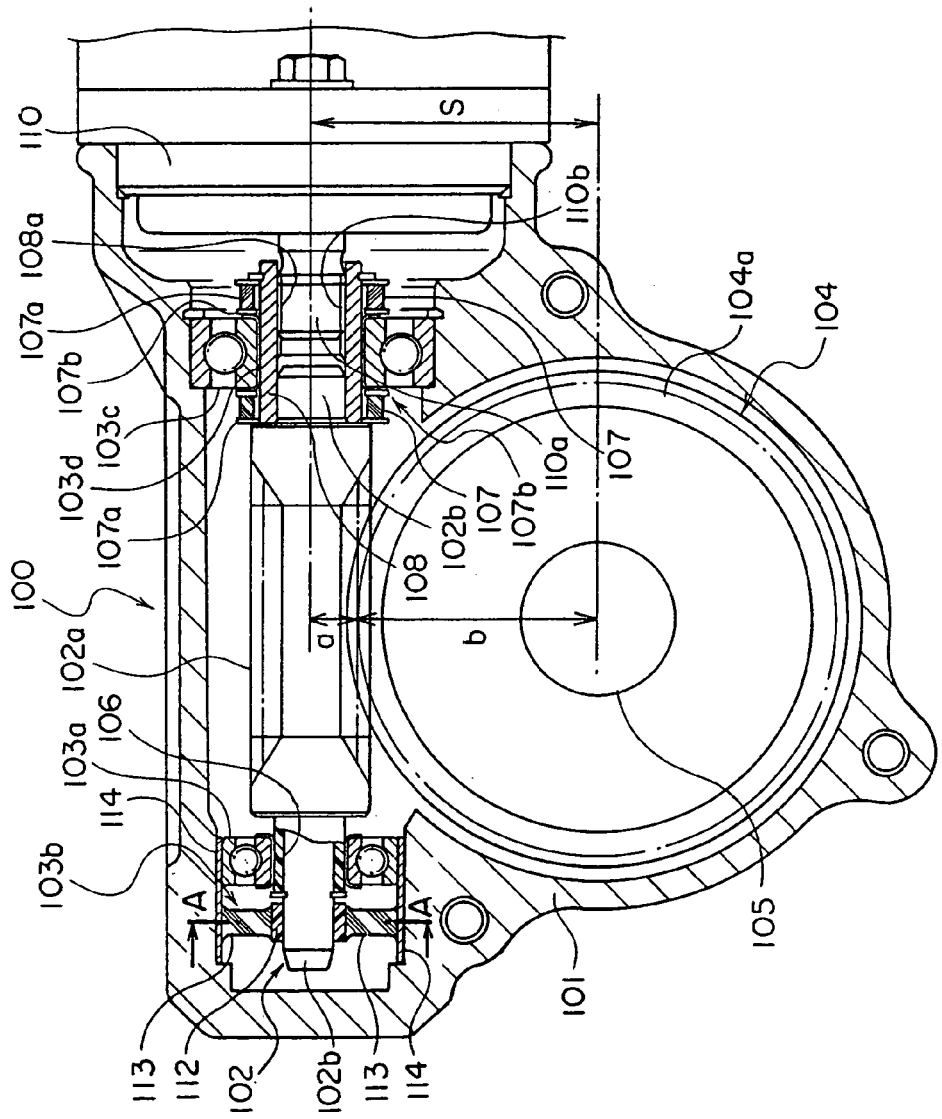

ELECTRIC POWER STEERING APPARATUS

CROSS-REFERENCE TO RELATED APPLICATION

This application is a continuation of application Ser. No. 10/491,564 filed Apr. 5, 2004 now U.S. Pat. No. 7,077,235, which is a 371 of PCT/JP02/12651 filed Dec. 3, 2002.

TECHNICAL FIELD

The present invention relates generally to an electric power steering apparatus including a worm deceleration mechanism, and more particularly to an electric power steering apparatus contriving an improvement in noises caused by a backlash.

BACKGROUND ART

Generally, a play (backlash) is provided between gears in order to obtain a smooth operation in gear meshing.

A worm wheel deceleration mechanism of the electric power steering apparatus also requires a proper backlash. Normally, an axis-to-axis distance between a gear housing shaft of a housing and an output shaft of a motor is set to the same as an axis-to-axis distance (a worm gear working radius plus a wheel gear working radius), and hence a backlash derived from a variety of working scatters in addition to the preset backlash. This caused-by-the-scatter backlash gives a driver an uncomfortable feeling due to tooth-butting noises when a vehicle travels on a rough road, resulting in a decline of value of a commercial product.

A countermeasure therefor was that the tooth-butting noises are reduced by setting the backlash as small as possible while raising a gear accuracy, or by a method, as disclosed in Japanese Patent Application Laid-Open No. 11-43062, of absorbing vibrations in a way that provides an elastic body between a worm shaft and a bearing thereof, and so forth.

Moreover, Japanese Patent Application Laid-Open No. 10-281235 discloses a power transmission apparatus, wherein the worm shaft is supported through the bearing in a shaft hole taking an elliptic shape that is formed in a worm shaft housing portion and is eccentric on the side of the worm wheel, and O-ring shaped elastic member is provided in a circular groove formed concentrically in an inner peripheral surface of the shaft hole, this elastic member biases the bearing (the worm shaft) towards the worm wheel, thereby eliminating the backlash.

Further, when assembling the worm shaft and the worm wheel, there might occurs a dimensional error between the worm, the worm shaft, a bearing portion supporting the worm shaft, the worm wheel and a steering shaft for supporting the worm wheel, etc. It follows that the backlash is caused at a comparatively large rate due to this dimensional error after being assembled. It was therefore required that the parts be assembled separately according to the accuracy thereof. Further, if a higher output of an auxiliary steering force advances as seen over the recent years, this results in an increase in abrasions of teeth of the worm and of the worm wheel, and a drawback comes to appear, wherein the occurrence of the backlash can not be avoided.

A known method for preventing gear butting noises derived from these causes is a method of eliminating the backlash by applying a pre-load to the worm towards the worm wheel. For example, as disclosed in Japanese Patent Application Laid-Open Nos. 2001-322554 and 2001-108025, there are known methods of generating a pre-load force by causing a deformation of an elastic body provided between an outer ring of the bearing provided at a side end of the worm and a gear housing.

Of the conventional electric power steering apparatuses disclosed in the former Publications, the apparatus disclosed in Japanese Patent Application Laid-Open No. 10-281235 has a drawback that the worm shaft housing portion is easy to abrade when the bearing moves and a problem that the worm shaft is easy to cause an axis deviation with respect to the motor shaft when the worm shaft is biased by the elastic member, and so on.

Generally, as far as there exists the backlash depending on a condition of a rough road, a difference between inputs from a motor vehicle and so on, a problem is that the tooth-butting noises can not be completely muffled, and there is a necessity of reducing the tooth-butting noises for every motor vehicle.

In the conventional electric power steering apparatuses disclosed in the latter Publications, a problem is that the quantity of deformation of the elastic body is determined from an outside diameter of a rolling bearing that is determined based on an inside diameter of a housing and a load, the elastic body has no alternative but minutely deforms because of a restraint in terms of a space, besides a pre-load force for the worm largely changes due to a minute displacement of a worm end that is caused by a scatter in working of the gear housing and by a deflection in meshing, and it is therefore difficult to ensure the pre-load force expected.

If this pre-load force is too large, an operating force declines, which brings about deterioration in feeling when neutral of steering. Whereas if too small, the gear butting noises emit, and an essential purpose can not be attained.

Thus, according to the prior art, even in a case where an axis-to-axis distance between the worm and the worm wheel changed due to the gear abrasion, etc., the pre-load varies due to the minute displacement of the worm, and it was difficult to ensure the stable pre-load.

Moreover, the load and a rotational torque acting in radial directions are applied to the elastic body provided on the outer periphery of the bearing whenever steered, and hence, as disclosed in Japanese Patent Application Laid-Open No. 2001-270448, deterioration such as a fatigue, etc occurs in the elastic body according to a structure for making flexural the elastic body serving as a slide bearing, and a problem arises from this deterioration, wherein the quantity of backlash rises, and the pre-load force decreases from a permanent deformation of the elastic body.

The load and the rotational torque acting in the radial directions have a great influence on the pre-load force given by the elastic body, with the result that the quantity of deformation of the elastic body augments. Therefore, if the axis-to-axis distance between the worm and the worm wheel increases and if a meshing area between the gears decreases, there also arises a problem that a strength of the gear declines this time.

An object of the present invention lies in providing a simply-structured electric power steering apparatus capable of improving the drawbacks to the examples of the prior art described above, eliminating an existence of the backlash and reducing tooth-butting noises without any decline of a power transmitting performance.

DISCLOSURE OF THE INVENTION

To accomplish the above object, according to a first invention of the present invention, an electric power steering apparatus with a worm gear mechanism which comprises a housing, a motor attached to the housing and transmitting an auxiliary steering force to a rotary shaft through a motor shaft, a bearing provided in the housing and rotatably supporting the rotary shaft by use of a shaft support hole, a worm being integral with or fitted on the rotary shaft and having a gear portion formed of a metal or a resin, an output shaft transmitting a steering force for steering an axle and rotatably supported in a predetermined position of the housing, and a worm wheel being integral with or fitted on the output shaft in a way that meshes with the worm and having a gear portion composed of a resin, the worm gear mechanism transmitting the auxiliary steering force of the motor to the output shaft, wherein the motor is installed with respect to the output shaft in such a position that a length which is the sum of a working radius of the worm and a working radius of the worm wheel becomes an axis-to-axis distance between the output shaft and the motor shaft, and the bearing is installed with respect to the output shaft in such a position that an axis-to-axis distance between the shaft support hole and the output shaft becomes slightly smaller than an axis-to-axis distance between the output shaft and the motor shaft.

Further, it is preferable that the bearing be supported on the rotary shaft through an elastic member, and the worm be slightly movable in an axial direction.

The apparatus being thus constructed, the rotary shaft is installed eccentrically towards the worm wheel from the axis of the motor, and therefore it follows that the worm shaft is pressed against the elastic member when assembled. This pressing force produces an elastic pre-load for pressing the worm against the worm wheel, whereby the worm meshes with the gear portion of the worm wheel with no backlash. Accordingly, the worm and the gear portion of the worm wheel mesh with each other by a proper frictional force, and the backlash is eliminated without any decline of a power transmitting performance.

Furthermore, according to a second invention of the present invention, an electric power steering apparatus with a worm gear mechanism which comprises a housing, a motor attached to the housing and transmitting an auxiliary steering force to a rotary shaft through a motor shaft, a worm formed on or fitted on the rotary shaft and having a gear portion composed of a metal or a resin, bearings provided in the housing, disposed respectively in positions on both sides of the worm and rotatably supporting the rotary shaft, an output shaft transmitting a steering force for steering an axle and rotatably supported in a predetermined position of the housing, and a worm wheel formed on or fitted on the output shaft in a way that meshes with the worm and having a gear portion formed of a resin, the motor installed in such a position that a length which is the sum of a working radius of the worm and a working radius of the worm wheel becomes an axis-to-axis distance between the output shaft and the motor shaft, wherein elastic members are disposed on both sides, in the axial direction, of the motor-sided bearing adjacently thereto so that the rotary shaft may be slightly movable in the axial direction within a limit of elasticity of the elastic members, the bearing positioned away from the motor is a rolling bearing, an elastic portion for biasing the worm in the meshing direction is provided on the rotary shaft, an outer ring of the bearing is fixedly fitted in a cylindrical bearing holding member fixedly fitted in the housing, its inner ring loosely receives therein the rotating shaft on which a cylindrical buffer member is fixedly fitted, and the elastic portion is constructed of a biasing member axially rotatably supporting the rotary shaft, and of an elastic body receives therein, the biasing member in a position eccentric in the meshing direction of the worm with respect to an axis of the bearing and fixed in the vicinity of the bearing holding member.

The apparatus being thus constructed, the rotary shaft is set in the position eccentric in the meshing direction of the worm by use of the elastic portion. Therefore, the rotary shaft is pressed against the buffer member of the bearing when the worm is assembled, and an elastic pre-load for pressing the worm against the worm wheel is produced. Accordingly, the worm and the gear portion of the worm wheel mesh with each other by the proper frictional force, and the backlash is eliminated without any decline of the power transmitting performance.

Particularly, a rate at which a volume of the elastic body occupies the elastic portion is taken large, whereby an initial eccentric quantity needed for generating the pre-load can be taken large and a spring constant of the elastic body can be decreased. Therefore, even when a configuration of the worm might change due to a scatter in working accuracy and an abrasion of the gear, it is feasible to stably maintain a fixed pre-load force and to effectively prevent the tooth-butting noises of the gears.

Further, the rotary shaft is movable in the axial directions, and hence, when a force is applied to the rotary shaft, the rotary shaft moves in the axial directions within the limit of the elasticity of the elastic member, whereby the worm and the gear portion of the worm wheel mesh with each other in the proper positions to absorb an impact, and the tooth-butting noises are thus reduced.

Moreover, the bearing receives a load and a rotational torque acting in the meshing direction of the worm, which are generated when driving (assisting) the apparatus, and thus controls a displacement of the worm. Therefore, neither a large distortion nor load occurs in the elastic body of the elastic portion, which leads to an improvement of a lifetime of the elastic body.

Still further, just when the rotary shaft abuts on the shaft support hole of the bearing, a displacement in a meshing opposite direction can not be made, and therefore a gear meshing area does not excessively decrease, thereby making it possible to prevent a decline of strength of the gear.

Furthermore, according to a third invention of the present invention, an electric power steering apparatus comprises a housing, a motor attached to the housing and transmitting an auxiliary steering force to a rotary shaft through a motor shaft, a worm formed on or fitted on the rotary shaft and having a gear portion formed of a metal or a resin, rolling bearings provided in the housing, disposed respectively in positions on both sides of the worm and rotatably supporting the rotary shaft, an output shaft transmitting a steering force for steering an axle and rotatably supported in a predetermined position of the housing, and a worm wheel formed on or fitted on the output shaft in a way that meshes with the worm and having a gear portion formed of the resin, wherein a pre-load applying mechanism for applying a pre-load acting towards the worm wheel is provided at the shaft side end portion, distal from the motor, of the rotary shaft.

According to the construction of the third invention, the pre-load applying mechanism sets the rotary shaft in the position eccentric in the meshing direction of the worm, so that the worm and the gear portion of the worm wheel mesh with each other by the proper frictional force, and the backlash is eliminated without any decline of the power transmitting performance.

BRIEF DESCRIPTION OF THE DRAWINGS

FIG. 13A is a sectional view of an electric power steering apparatus, showing a first embodiment of a second invention of the present invention; FIG. 13B is a sectional view taken along the line A—A in FIG. 13A;

THE EMBODIMENTS OF THE INVENTION

An embodiment of a first invention of the present invention will hereinafter be described with reference to the drawings.

Figure 1:
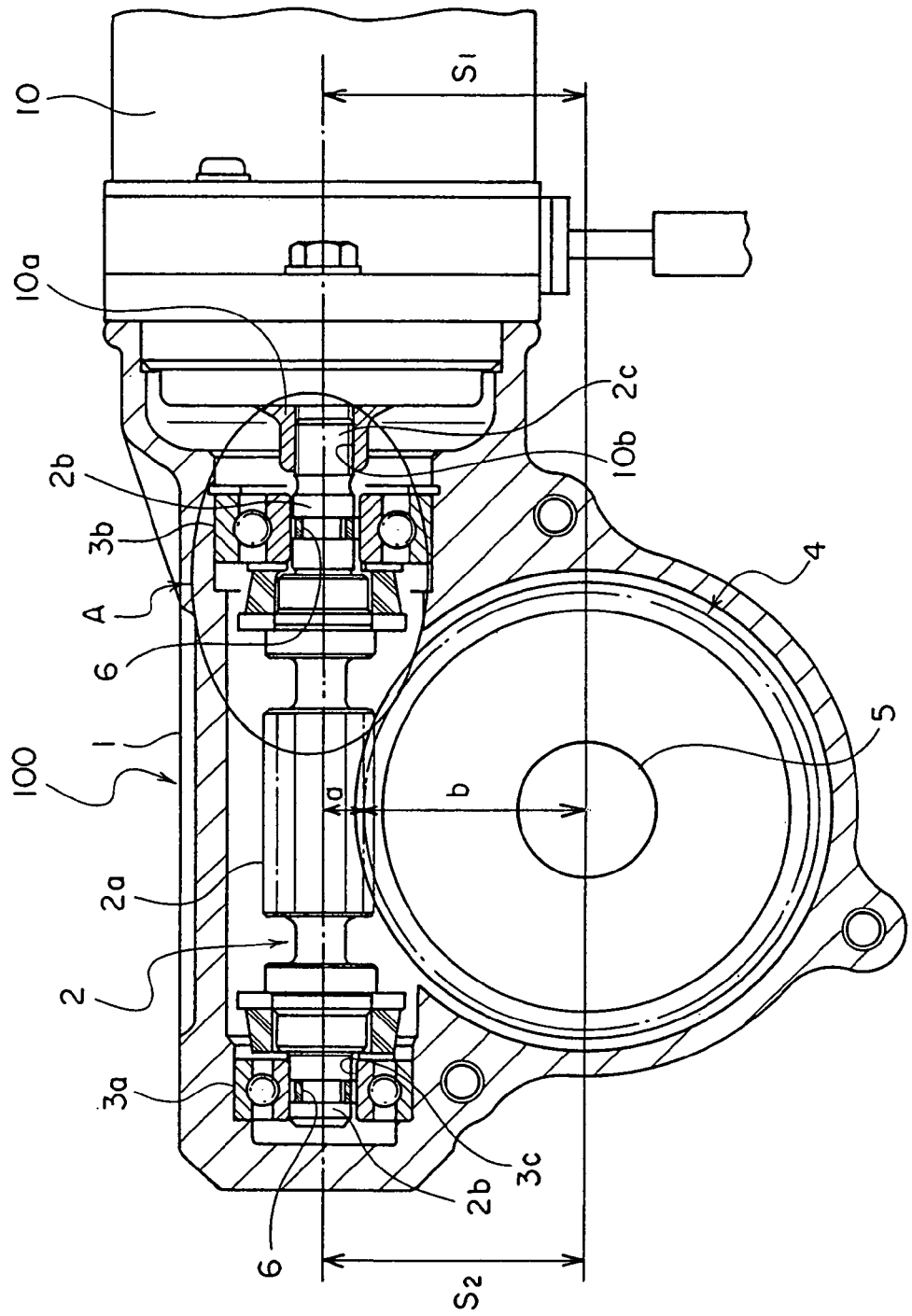
FIG. 1 is a sectional view of an electric power steering apparatus, showing a first embodiment of a first invention of the present invention.
Figure 2A:
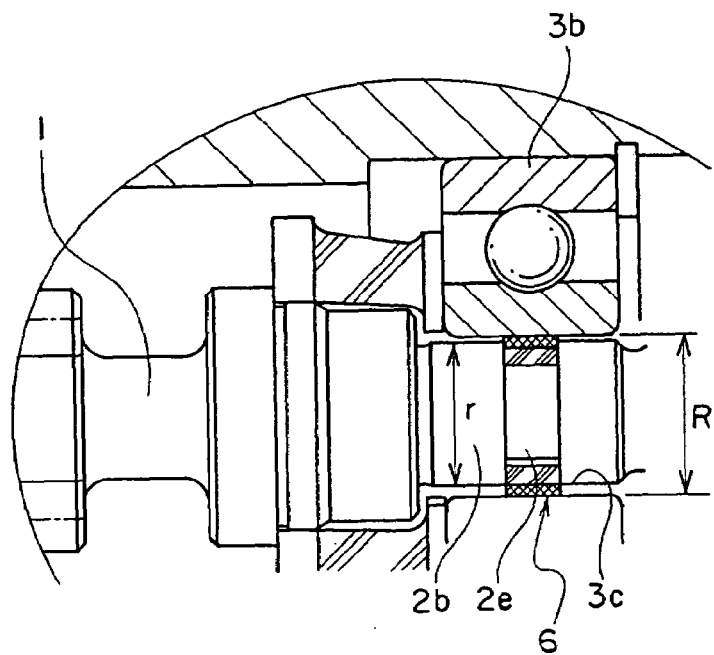
FIG. 2A is a partial enlarged view of a portion A in FIG. 1.
Figure 2B:
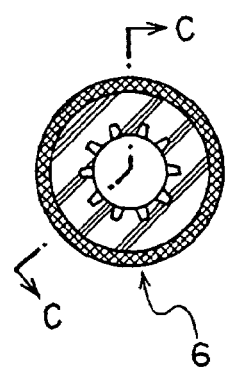
FIG. 2B is a sectional view of a portion of an elastic member in FIG. 1.

FIG. 1 is a sectional view of a configuration of an electric power steering apparatus, showing the first embodiment of the first invention of the present invention. FIG. 2A is a partial enlarged view of a portion A in FIG. 1. FIG. 2B is a sectional view showing a portion of an elastic member in FIG. 1.

In an electric power steering apparatus 100 in FIG. 1, an electric motor 10, ball bearings 3a, 3b for rotatably supporting a worm shaft 2, an output shaft 5 of a worm wheel 4, etc., are disposed or fixed in predetermined positions in a housing 1.

The worm shaft 2 is constructed of a worm 2a formed substantially on a central portion thereof, bearing support portions 2b formed on both sides of this worm 2a, a serrated portion 2c formed at one end portion (at a right end portion in the Figure) of the worm shaft 2, and so forth. On the other hand, a serrated hole 10b is formed inside a motor shaft 10a of the electric motor 10. The serrated portion 2c of the worm shaft 2 is loosely fitted in the serrated hole 10b, whereby the worm shaft 2 is joined to the motor shaft 10a in a way that is movable in the axial directions but unmovable in a rotational direction.

As illustrated in FIG. 1 and 2A, the bearing support portions 2b, 2b are fitted in inner peripheral surfaces of the ball bearings 3a, 3b. An annular groove 2e is formed in an axially central portion of each bearing support portion 2b, and an annular elastic member 6 is fitted with no clearance on this annular groove 2e.

A diameter of an outer peripheral surface of the elastic member 6 is set slightly larger than an outside diameter r of the bearing support portion 2b. This annular elastic member 6 includes a rubber bush 6a as its body of which an inside-diametrical portion takes a bellows-like shape and is fitted on a bottom peripheral surface of the annular groove 2e, and a ring-like material (for example, Teflon (registered trademark) material) 6b that has a small coefficient of friction and is welded to an outer periphery of the rubber bush 6a in order to allow the worm shaft 2 to move in the axial directions.

The worm wheel 4 is fixedly fitted on the output shaft 5 extending in a direction orthogonal to the axial direction of the worm shaft 2 and is, the output shaft 5 being rotatably supported in a predetermined position of the housing 1 in a state of the worm wheel 4 meshing with the worm 2a, thus disposed. A gear portion 4a of the worm wheel 4 is formed of a resin.

As illustrated in FIG. 1, in the meshing between the worm 2a and the worm wheel 4, let S1(a+b=S1) be a distance which is the sum of a working radius a of the worm 2a and a working radius b of the worm wheel 4, and the output shaft 5 and the electric motor 10 are disposed in the housing 1 so that an axis-to-axis distance between the motor shaft 10a of the electric motor 10 and the output shaft 5 of the worm wheel 4 becomes S1. On the other hand, the bearing 3a on a distal side from the electric motor 10 is disposed in the housing 1 in such a position that an axis-to-axis distance S2 between a shaft support hole 3c of the bearing 3a and the output shaft 5 becomes slightly smaller than the axis-to-axis distance S1 between the output shaft 5 and the motor shaft 10a. In the present embodiment, these distances S1, S2 are set such as S1=47.5 mm ad S2=47.2 mm, and a difference $\Delta S$ between the axis-to-axis distance S1 and the axis-to-axis distance S2 is given by (S1−S2=$\Delta S$). An optimal value of this difference $\Delta S$ is 0.1 mm through 0.5 mm.

Figure 2C:
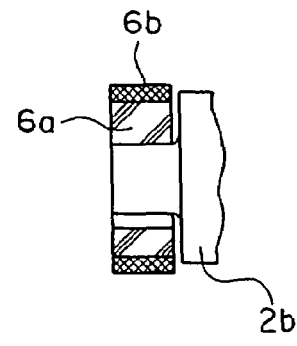
FIG. 2C shows a section taken along the line C—C in FIG. 2B.

In this connection, as shown in FIG. 2, the outside diameter r of each of the bearing support portions 2b rotatably supported on the ball bearings 3a, 3b of the worm shaft 2, is set to a dimension given by (a shaft support hole 3c inside diameter R−2·$\Delta S$). Along with this, a thickness of the elastic member 6 is set to a value enough to permit loose fitting therein of the bearing support portion 2b of the worm shaft 2.

In this construction, the axis of the shaft support hole 3c of each of the ball bearings 3a, 3b is set, as described above, eccentric by ΔS towards the worm wheel 4. Therefore, when incorporated, the worm 2a and the gear portion 4a of the worm wheel 4 mesh with each other without any backlash, however, with reaction thereof, it follows that the worm shaft 2 (the bearing support portion 2b) is pressed against the annular elastic member 6. This pressing force produces an elastic pre-load for pressing the worm 2a against the worm wheel 4, while the worm 2a is kept in a so-called floating state.

This pre-load force generates a friction to some extent when the worm 2a meshes with the worm wheel 4, however, the thickness and a rigidity of the annular elastic member 6 are set so that a resistance force thereof does not become excessively large enough to cause a hindrance to a gear performance or to such a degree that a deviation in meshing does not occur due to an input of vibrations applied from tires. The rigidity of the elastic member 6 can be set depending on hardness and a configuration of the rubber without any restriction.

Further, the worm shaft 2 is movable in the axial directions, and hence the worm 2a and the gear portion 4a of the worm wheel 4 can be meshed with each other in their proper positions.

Thus, the inside diameter of the shaft support hole 3c of each of the ball bearings 3a, 3b is set eccentric, the diameter of the worm shaft 2 (the bearing support portion 2b) is set comparatively small, and the annular elastic members 6b, are provided between the worm shaft 2 and the bearings 3a, 3b, which all cooperate to enable a pre-load mechanism to be easily structured and the backlash to be eliminated.

According to the first embodiment of the first invention, both of eccentric quantities of the inside diameters of the shaft support holes 3c of the bearings 3a, 3b are set likewise to ΔS, however, the eccentric quantity of the bearing 3b on the proximal side to the motor 10 can be set smaller than the eccentric quantity ΔS of the bearing 3b. Namely, the distance between the axis of the bearing 3a on the distal side from the motor and the axis of the output shaft 5, can be set larger than the distance between the axis of the bearing 3b on the proximal side to the motor and the axis of the output shaft 5. It is desirable that a difference ΔS' between the eccentric quantities be a value of 0 through ΔS/2. This construction is more desirable in terms of preventing the axis deviation between the motor shaft 10a and the worm shaft 2 by reducing the rotational resistance of the worm shaft 2.

Next, a second embodiment of the first invention of the present invention will be described in conjunction with the drawings.

Figure 3:
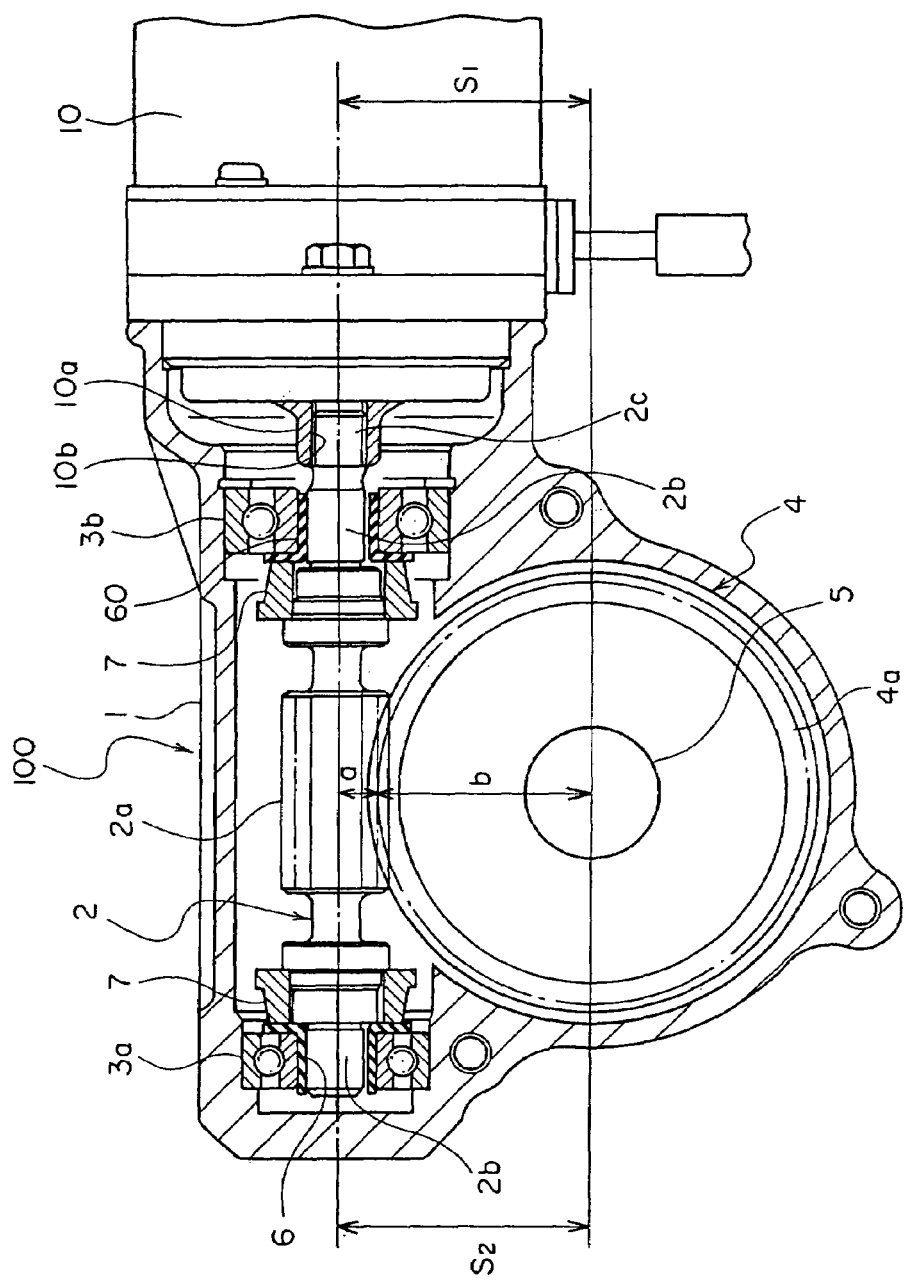
FIG. 3 is a sectional view of an electric power steering apparatus, showing a second embodiment of the first invention of the present invention.
Figure 4:
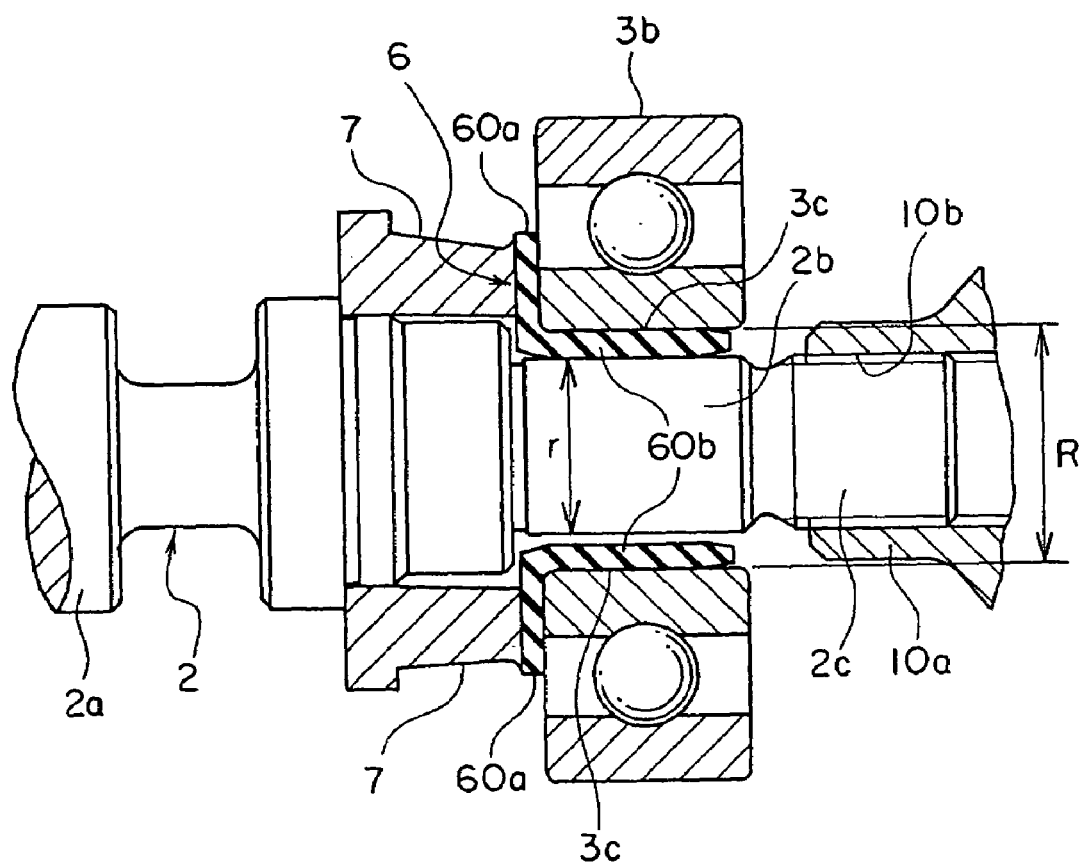
FIG. 4 is a partial enlarged view showing a bearing portion in FIG. 3.

FIG. 3 is a sectional view of a construction of the electric power steering apparatus, showing the second embodiment of the first invention of the present invention. FIG. 4 is an enlarged view showing a bearing portion in FIG. 3.

Throughout the following discussion, the components having the similar structures as those in the first embodiment of the first invention will be explained by use of the same numerals or symbols.

In the electric power steering apparatus 100 in FIG. 3, the electric motor 10, the ball bearings 3a, 3b for rotatably supporting the worm shaft 2, the output shaft 5 of the worm wheel 4, etc., are disposed or fixed in predetermined positions in the housing 1.

The worm shaft 2 is constructed of the worm 2a formed substantially on the central portion thereof, the bearing support portions 2b formed on both sides of this worm 2a, the serrated portion 2c formed at one end portion (at a right end portion in the Figure) of the worm shaft 2, and so forth. On the other hand, the serrated hole 10b is formed inside the motor shaft 10a of the electric motor 10. The serrated portion 2c of the worm shaft 2 is loosely fitted in the serrated hole 10b, whereby the worm shaft 2 is joined to the motor shaft 10a in a way that is movable in the axial directions but unmovable in the rotational direction.

As shown also in FIG. 4, annular elastic members 60 each having a predetermined thickness and predetermined elasticity are respectively fitted with no gap in the inner peripheral surfaces of the shaft support holes 3c of the ball bearings 3a, 3b. The annular elastic member 60 is constructed of a collar portion 60a and a cylindrical portion 60b, wherein the cylindrical portion 60b is fitted in the shaft support hole 3c, and the bearing support portion 2b of the worm shaft 2 is loosely fitted in the cylindrical portion 60b. Accordingly, the worm shaft 2 is rotatably supported by the ball bearings 3a, 3b through the elastic members 60 in these bearing support portions 2b.

Elastic member support members 7 are fixedly fitted on the worm shaft 2, wherein these members 7 are disposed adjacent to the pair of bearing support portions 2b respectively on the side of the worm 2a. These elastic member support members 7 have a function of holding the collar portions 60a of the elastic members 60, respectively between the bearings 3a, 3b and the support members 7 and allowing displacements, in the axial directions (in the right-and-left directions in the Figure), of the worm shaft 2 within a limit of the elasticity of the elastic members 60.

The worm wheel 4 is fixedly fitted onto the output shaft 5 extending in the direction orthogonal to the axial direction of the worm shaft 2 and is, the output shaft 5 being rotatably supported in the predetermined position of the housing 1 in the state of the worm wheel 4 meshing with the worm 2a, thus disposed. The gear portion 4a of the worm wheel 4 is formed of a resin.

As illustrated in FIG. 3, in the meshing between the worm 2a and the worm wheel 4, let S1 (a+b=S1) be a distance which is the sum of the working radius a of the worm 2a and the working radius b of the worm wheel 4, and the output shaft 5 and the electric motor 10 are disposed in the housing 1 so that the axis-to-axis distance between the motor shaft 10a of the electric motor 10 and the output shaft 5 of the worm wheel 4 becomes S1. On the other hand, the bearings 3a, 3b are disposed in the housing 1 in such positions that the axis-to-axis distance S2 between the shaft support hole 3c thereof and the output shaft 5 becomes slightly smaller than the axis-to-axis distance S1 between the output shaft 5 and the motor shaft 10a. The difference ΔS between the axis-to-axis distance S1 and the axis-to-axis distance S2 is given by (S1−S2=ΔS). This difference Δs is set to an optimal value of 0.1 mm through 0.5 mm.

In this connection, as shown in FIG. 4, the outside diameter r of each of the bearing support portions 2b rotatably supported on the ball bearings 3a, 3b of the worm shaft 2, is set to a dimension given by (a shaft support hole 3c inside diameter R−2·ΔS). Along with this, a thickness of the elastic member 60 is set to a value to the extent that the bearing support portion 2b of the worm shaft 2 is loosely fitted therein.

In this construction, the axis of the shaft support hole 3c of each of the ball bearings 3a, 3b is set, as described above, eccentric by ΔS towards the worm wheel 4. Hence, when incorporated, the worm 2a and the gear portion 4a of the worm wheel 4 mesh with each other without any backlash, however, with the reaction thereof, it follows that the worm shaft 2 (the bearing support portion 2b) is pressed against a cylindrical portion 60b of the annular elastic member 60. This pressing force produces an elastic pre-load for pressing the worm 2a against the worm wheel 4, and therefore the worm 2a is kept in the so-called floating state.

This pre-load force generates the friction to some extent when the worm 2a meshes with the worm wheel 4, however, the thickness and a rigidity of the elastic member 60 are set so that the resistance force thereof does not become excessively large enough to cause the hindrance to the gear performance or to such a degree that the deviation in meshing does not occur due to the input of vibrations applied from tires. The rigidity of the elastic member 60 can be set depending on the hardness and the configuration of the rubber without any restriction.

Further, the worm shaft 2 is movable in the axial directions within the limit of the elasticity of the collar portion 60a of the elastic member 60, and hence the worm 2a and the gear portion 4a of the worm wheel 4 can be meshed with each other in their proper positions.

Thus, the inside diameter of the shaft support hole 3c of each of the ball bearings 3a, 3b is set eccentric, the diameter of the worm shaft 2 (the bearing support portion 2b) is set comparatively small, and the elastic member 60 is provided between the worm shaft 2 and the bearings 3a, 3b, which all cooperate to enable a pre-load mechanism to be easily structured and the backlash to be eliminated.

Next, a third embodiment of the first invention of the present invention will be described.

Figure 5:
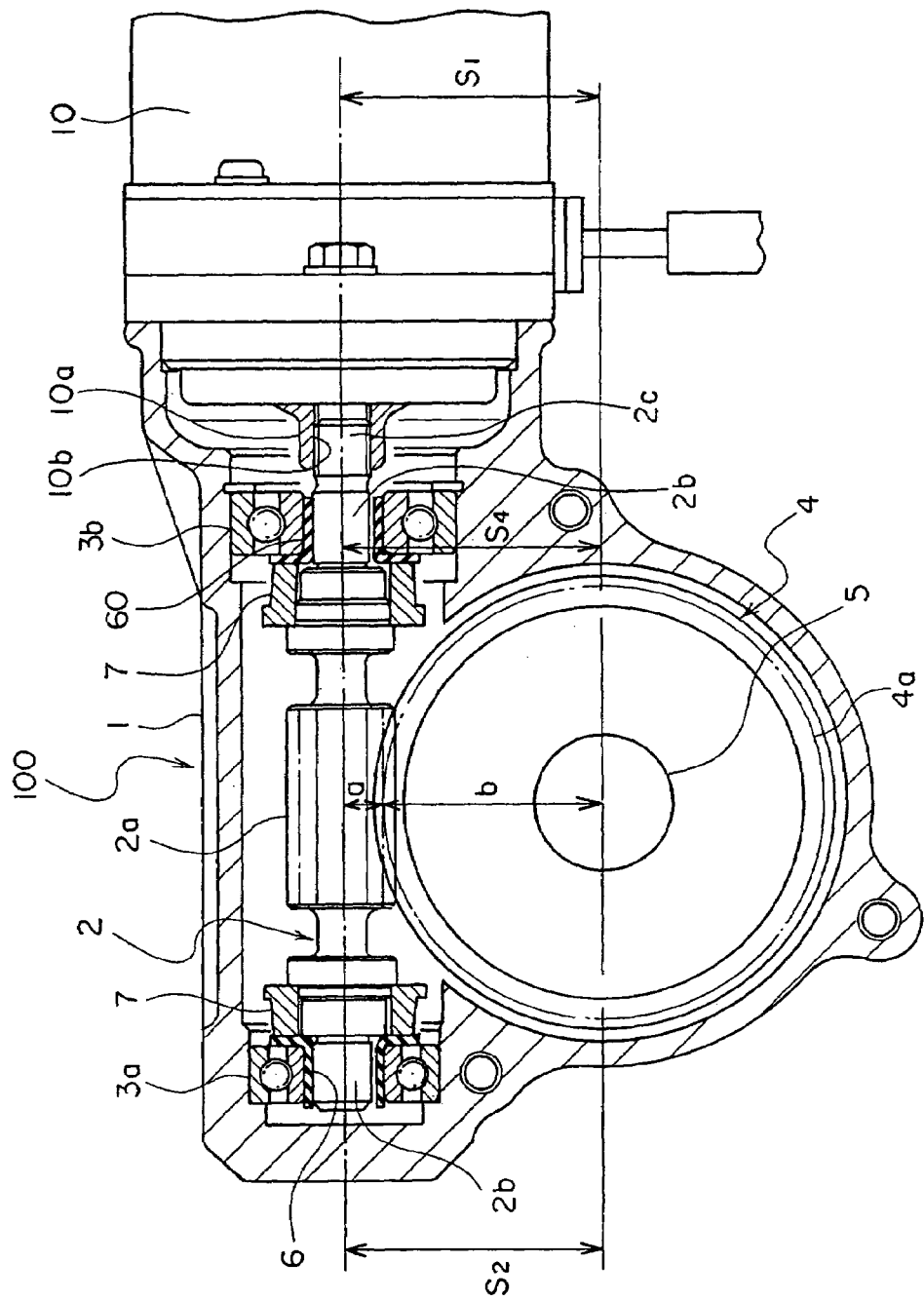
FIG. 5 is a sectional view of an electric power steering apparatus, showing a third embodiment of the first invention of the present invention.

FIG. 5 is a sectional view of the electric power steering apparatus, showing the third embodiment of the first invention of the present invention. The third embodiment of the first invention has the same construction as the second embodiment of the first invention has, except for points that will hereinafter be explained. Therefore, the similar components as those in the second embodiment of the first invention are illustrated in a way that marks them with the same numerals or symbols, and their repetitive explanations are omitted.

In the second embodiment of the first invention discussed above, both of the eccentric quantities of the inside diameters of the shaft support holes 3c of the bearings 3a, 3b are set likewise to ΔS, however, according to the third embodiment of the first invention, the eccentric quantity of the bearing 3b on the proximal side to the motor 10 can be set smaller than the eccentric quantity ΔS of the bearing 3b. Namely, in the third embodiment of the first invention illustrated in FIG. 5, a distance S3 between the axis of the bearing 3a on the distal side from the motor and the axis of the output shaft 5, is set larger than a distance S4 between the axis of the bearing 3b on the proximal side to the motor and the axis of the output shaft 5. It is desirable that a difference ΔS' (S3−S4=ΔS') between S3 and S4 be a value of 0 through ΔS/2. This construction is more desirable in terms of preventing the axis deviation between the motor shaft 10a and the worm shaft 2 by reducing the rotational resistance of the worm shaft 2.

Next, a fourth embodiment of the first invention of the present invention will be discussed with reference to the drawings.

Figure 6:
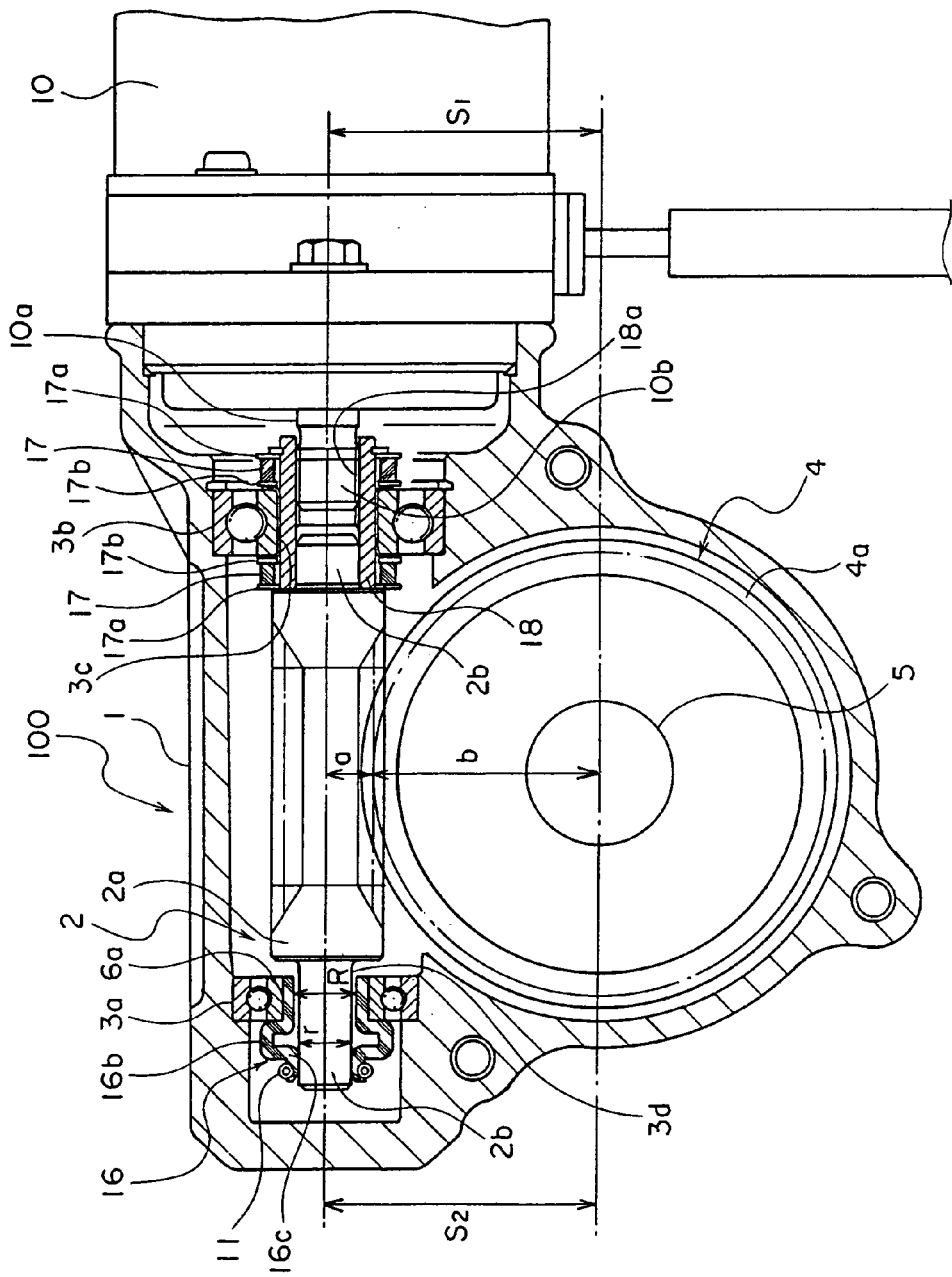
FIG. 6 is a sectional view of an electric power steering apparatus, showing a fourth embodiment of the first invention of the present invention.
Figure 7:
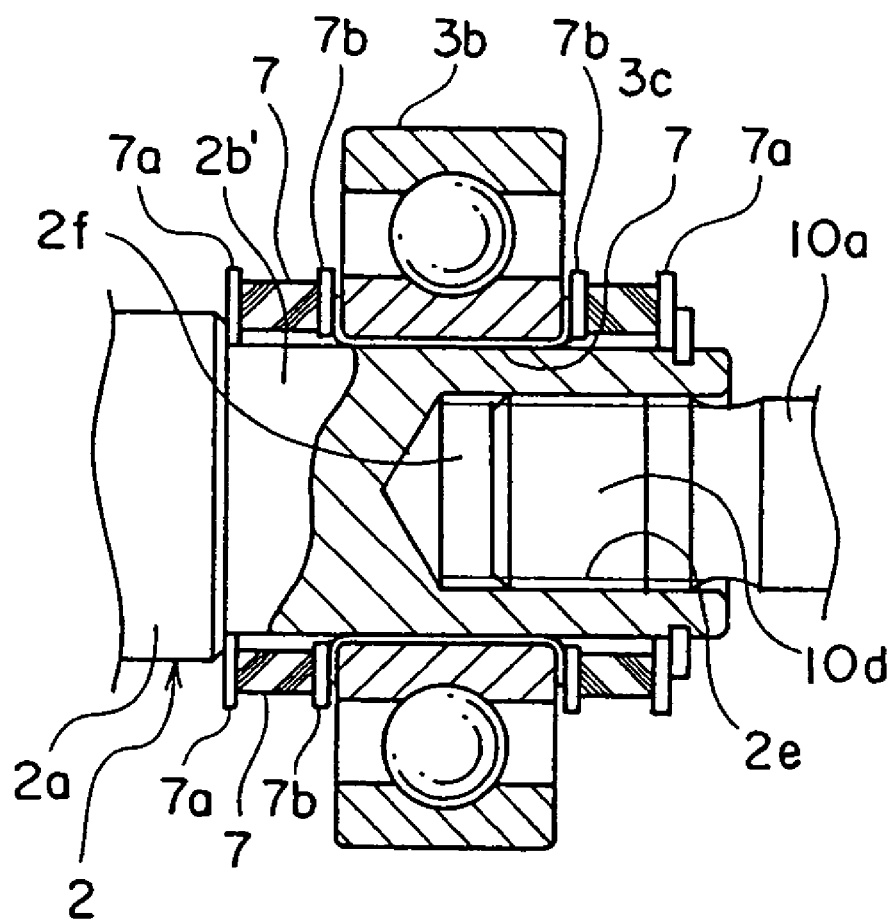
FIG. 7 is a sectional view showing a modified example of a spline connecting portion in the electric power steering apparatus in FIG. 6.
Figure 8:
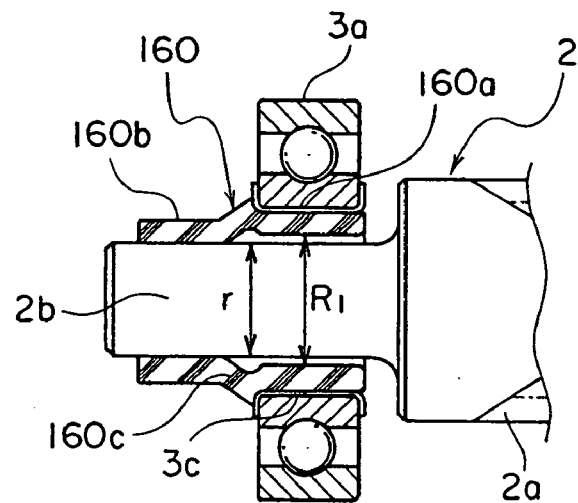
FIG. 8 is a sectional view showing a first modified example of the elastic member in the electric power steering apparatus in FIG. 6.
Figure 9:
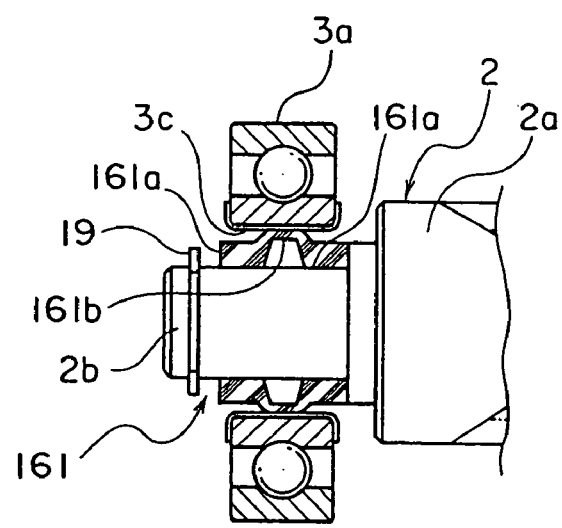
FIG. 9 is a sectional view showing a second modified example of the elastic member in the electric power steering apparatus in FIG. 6.
Figure 10A:
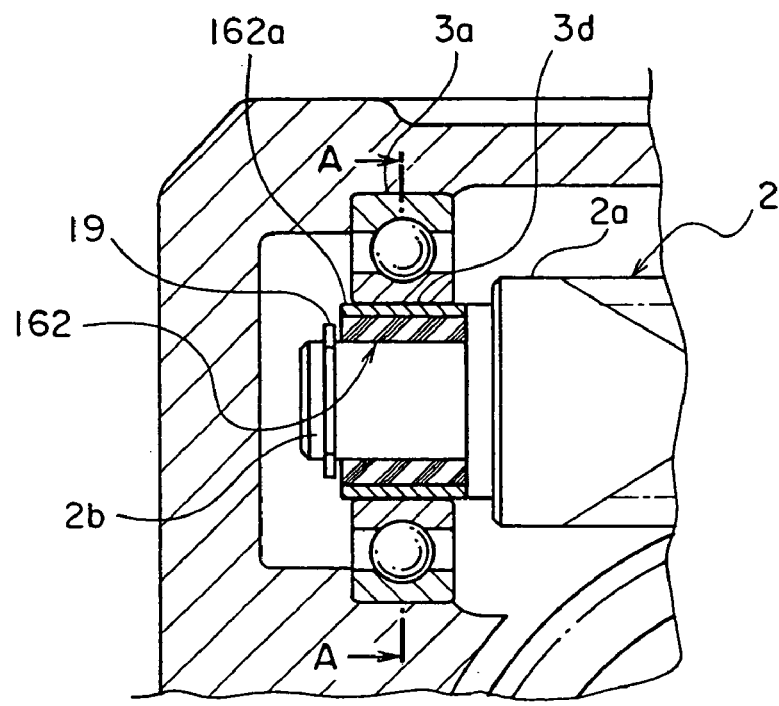
FIG. 10A is a sectional view showing a third modified example of the elastic member in the electric power steering apparatus in FIG. 6.
Figure 10B:
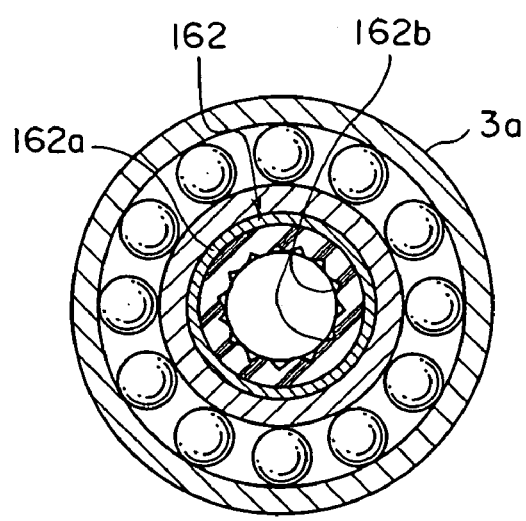
FIG. 10B is a sectional view taken along the line A—A in FIG. 10A.

FIG. 6 is a sectional view of the electric power steering apparatus, showing the fourth embodiment of the first invention of the present invention. FIG. 7 is a sectional view showing a modified example of a spline connecting portion in the electric power steering apparatus in FIG. 6. FIG. 8 is a sectional view showing a first modified example of the elastic member in the electric power steering apparatus in FIG. 6. FIG. 9 is a sectional view showing a second modified example of the elastic member in the electric power steering apparatus in FIG. 6. FIG. 10A is a sectional view showing a third modified example of the elastic member in the electric power steering apparatus in FIG. 6. FIG. 10B is a sectional view taken along the line A—A in FIG. 10A.

In the electric power steering apparatus 100 in FIG. 6, the electric motor 10, the ball bearings 3a, 3b for rotatably supporting the worm shaft 2 defined as a rotary shaft, the output shaft 5 of the worm wheel 4, etc., are disposed or fixed in predetermined positions in the housing 1.

The worm shaft 2 is constructed of the worm 2a formed substantially on the central portion thereof, and the bearing support portions 2b formed on both sides of this worm 2a. A connecting member 18 taking a cylindrical shape is fixedly fitted on the bearing support portion 2b (on the right side in the Figure) on the side of the bearing 3b proximal to the electric motor 10. A female spline portion 18a is formed substantially in a half, in the axial direction, of an inner peripheral surface of the connecting member 18. The connecting member 18 is fitted in the shaft support hole 3c (an inner peripheral surface of an inner ring) of the bearing 3b so that this connecting member 18 is movable in the axial directions.

On the other hand, a male spline portion 10b is provided on a front end portion of the motor shaft 10a of the electric motor 10. This male spline portion 10b is loosely fitted in the female spline portion 18a of the connecting member 18, whereby the worm shaft 2 is spline-connected to the motor shaft 10a in a state of being movable in the axial directions but unmovable in the rotational direction. This spline connecting portion is set so that substantially a half of this connecting portion is positioned within the shaft support hole 3c of the bearing 3b. The spline connecting portion is set so that at least the half thereof in the axial direction, in other words, the half or more of the spline connecting portion in the axial direction is positioned within the shaft support hole 3c of the bearing 3b.

A part of an elastic member 16 taking substantially the cylindrical shape is fixedly fitted in a shaft support hole 3d of the bearing 3a on the distal side from the electric motor 10. This elastic member 16 is constructed of a fitting portion 16a, a large diametrical portion 16b, of which an outside diameter is larger than a diameter of the shaft support hole 3d, formed adjacent to the fitting portion 16a, and a shaft support portion 16c formed in continuation from the large diametrical portion 16a and having an inside diameter substantially equal to an outside diameter of the bearing support portion 2b. A fastening ring 11 for fixedly fitting the shaft support portion 16c on the bearing support portion 2b of the worm shaft 2, is fitted on an outer peripheral portion of the shaft support portion 16c.

This axial support portion 16c has a function of elastically holding the bearing support portion 2b of the worm shaft 2 substantially in an intermediate position within the inside diameter of the fitting portion 16a. The large diametrical portion 16b has a function of facilitating the axial movements of the worm shaft 2 by a contrivance that the shaft support portion 16c extends and shrinks in the axial directions when moving together with the bearing support portion 2b in the axial directions.

An inside diameter R1 (see also FIG. 8) of the fitting portion 16a of the elastic member 16 is set slightly larger than the outside diameter r of the bearing support portion 2b rotatably supported by the bearing 3a. The outside diameter r of the bearing support portion 2b is set to a dimension given by (a fitting portion 16a inside diameter R1−2·ΔS). This is a value of such a degree that the bearing support portion 2b of the worm shaft 2 is loosely fitted in the fitting portion 16a.

On the other hand, elastic members 17 each assuming substantially a ring-shape are disposed on both sides of the bearing 3b proximal to the electric motor 10 in the axial direction adjacently to the bearing 3b. These two elastic members 17 are so disposed that each is held by two pieces of ring-shaped holding members 17a and 17b (see also FIG. 7). The holding members 17a positioned away from the bearing 3b are each fixedly fitted on the connecting member 18. The holding members 17b positioned on the side of the bearing 3b are fixed to the bearing 3b and provided along the connecting member 18a in a non-contact manner. The elastic member 17 elastically extends and shrinks in the axial directions as the connecting member 18 moves in the axial directions, thereby allowing the worm shaft 2 to move in the axial directions within the limit of the elasticity thereof.

The worm wheel 4 is fixedly fitted on the output shaft 5 extending in the direction orthogonal to the axial direction of the worm shaft 2. The output shaft 5 is so disposed as to be rotatably supported in the predetermined position of the housing 1 in the state of the worm wheel 4 meshing with the worm 2a. The gear portion 4a of the worm wheel 4 is formed of a resin.

As illustrated in FIG. 6, in the meshing between the worm 2a and the worm wheel 4, let S1 (a+b=S1) be a distance which is the sum of the working radius a of the worm 2a and the working radius b of the worm wheel 4, and the output shaft 5 and the electric motor 10 are disposed in the housing 1 so that the axis-to-axis distance between the motor shaft 10a of the electric motor 10 and the output shaft 5 of the worm wheel 4 becomes S1. On the other hand, the bearing 3a on the distal side from the electric motor 10 is disposed in the housing 1 in such a position that the axis-to-axis distance S2 between the shaft support hole 3d of the bearing 3a and the output shaft 5 becomes slightly smaller than the axis-to-axis distance S1 between the output shaft 5 and the motor shaft 10a. In this embodiment, the distances S1, S2 are set such as S1=47.5 mm, and S2=47.2 mm. It is effective that the difference ΔS(S1−S2=ΔS) between the axis-to-axis distance S1 and the axis-to-axis distance S2 be set to an optimal value in a range of 0.1 mm through 0.5 mm.

In the construction described above, the axis of the shaft support hole 3d of the bearing 3a is set, as described above, eccentric by ΔS towards the worm wheel 4. Hence, when incorporated, the worm 2a and the gear portion 4a of the worm wheel 4 mesh with each other without any backlash, however, with the reaction thereof, it follows that the worm shaft 2 (the bearing support portion 2b) is pressed against the elastic member 6. This pressing force produces an elastic pre-load for pressing the worm 2a against the worm wheel 4. Thus, the worm 2a is kept in the so-called floating state.

This pre-load force generates the friction to some extent when the worm 2a meshes with the worm wheel 4, however, the thickness and the rigidity of the elastic member 16 are set so that the resistance force thereof does not become excessively large enough to cause the hindrance to the gear performance or to such a degree that the deviation in meshing does not occur due to the input of vibrations applied from tires. The rigidity of this elastic member 16 can be set depending on the hardness and the configuration of the rubber without any restriction.

Further, the worm shaft 2 is movable in the axial directions, and hence, when a force is applied from the tire, the worm shaft 2 moves in the axial directions within the limit of the elasticity of the elastic member 7, whereby the worm 2a and the gear portion 4a of the worm wheel 4 mesh with each other in proper positions to make it possible to absorb an impact.

Incidentally, the worm shaft 2 is movable in directions of meshing between the worm 2a and the worm wheel 4 at a portion of the bearing 3a on the distal side from the electric motor 10. Therefore, the worm shaft 2 has a possibility of causing a hindrance to the axial movements of the worm shaft 2 due to an axis deviation occurred in the spline connecting portion, wherein the bearing 3b on the proximal side to the electric motor 10 serves as a fulcrum.

According to the fourth embodiment of the first invention, however, substantially the half, in the axial direction, of the spline connecting portion between the worm shaft 2 and the motor shaft 10a is so set as to be positioned within the shaft support hole 3c of the bearing 3b. Hence, even when the worm shaft 2 slightly moves in the meshing direction of the worm 2a, with the bearing 3b serving as the fulcrum, a displacement of the worm shaft 2 is allowed owing to a slight play of the spline connecting portion, and the worm shaft 2 can move in the axial directions without wresting the spline connecting portion.

Thus, the inside diameter of the shaft support hole 3c of the ball bearing 3a is set eccentric, the diameter of the worm shaft 2 (the bearing support portion 2b) is set comparatively small, and the elastic members 16, 17 are provided between the worm shaft 2 and the bearings 3a, 3b, which all cooperate to enable a pre-load mechanism to be easily structured, the backlash to be completely eliminated, the impact to be absorbed and the tooth-butting noises (rattle noises) to be restrained.

Note that the fourth embodiment of the first invention has involves using the connecting member 18 for the spline connecting portion. The invention is not, however, limited to this construction and may take such a construction that, as shown in FIG. 7, a bearing support portion 2b' on the side of the bearing 3b is molded to have substantially the same diameter as the outside diameter of the connecting member 18, a connecting hole 2f including a female spline portion 2e for the motor shaft 10a, and a male spline portion 10d of the motor shaft 10a is inserted into this connecting hole 2f, thus attaining a spline connection. In this case also, the holding members 17a, 17b are attached to the bearing support member 2b' with the same configuration as in the embodiment of the connecting member 18 described above. Referring to FIG. 7, the same members as those of the apparatus in FIG. 6 are marked with the same numerals or symbols.

Next, modified examples of the elastic member 16 will be described referring to FIGS. 8 to 10B inclusive.

FIG. 8 shows a first modified example of the elastic member 16. Referring to FIG. 8, the same members as those in the embodiment in FIG. 6 are marked with the same numerals or symbols, and the repetitive explanations thereof are omitted. A cylindrical elastic member 160 is constructed of a fitting portion 160a (which is the same as that of the elastic member 16) serving as a portion that loosely fits therein the bearing support portion 2b and is fixedly fitted in the shaft support hole 3c of the bearing 3a, a shaft support portion 160b adjacent to the fitting portion 160a, having substantially the same inside diameter as the outside diameter of the bearing support portion 2b and receiving therein the bearing support portion 2b with no gap therebetween, and a truncated conic portion 160c for integrally connecting the fitting portion 160a and the shaft support portion 160b. Namely, the elastic member 160 has a configuration that an axial length of the shaft support portion 16c is extended instead of a configuration, the large diametrical portion 16b is removed from the elastic member 16 described above, and no fastening ring 11 is provided.

A relationship between the inside diameter R1 of the fitting portion 160a of the cylindrical elastic member 160 and the outside diameter r of the bearing support portion 2b is the same as in the embodiment in FIG. 6, and hence its repetitive explanation is omitted.

In this construction, the shaft support portion 160b has a function of elastically holding the bearing support portion 2b substantially in an intermediate position within the inside diameter of the fitting portion 160a. It is required that an inside diameter of the axial support portion 160b be set to such a dimension as to make an inner ring of the bearing 3a rotatable as the shaft support portion 160b rotates with rotations of the bearing support portion 2b and as to make the bearing support portion 2b smoothly slidable when the bearing support portion 2b moves in the axial directions. It can be expected that this elastic member 160 exhibits the same effects as the elastic member 16 does.

FIG. 9 shows a second modified example of the elastic member 16. Referring to FIG. 9, the same members as those in the embodiment in FIG. 6 are marked with the same numerals or symbols, and the repetitive explanations thereof are omitted. A cylindrical elastic member 161 is constructed of an shaft support portion 161a having substantially the same inside diameter as the outside diameter of the bearing support portion 2b and fitting therein the bearing support portion 2b with no gap, and a protruded portion 161b formed as a large diametrical portion having a small wall thickness formed integrally with an intermediate portion, in the axial direction, of the shaft support portion 161a, the protruded portion 161b being fixedly fitted in the shaft support hole 3c of the bearing 3a. It is required that an inside diameter of the shaft support portion 161a be set to a dimension that makes the bearing support portion 2b smoothly slidable when the bearing support portion 2b moves in the axial directions. A ring-shaped stopper 19 is fixedly fitted on a left end portion, as viewed in the Figure, of the bearing support portion 2b.

In this construction, the shaft support portion 161a permits the bearing support portion 2b to move in the axial direction (away from or towards from the motor 10) but the stopper 19 restricts. When the bearing support portion 2b moves in the meshing direction of the worm 2a, the protruded portion 161b is compressed in a direction that presses the inner peripheral surface of the shaft support hole 3c, thereby elastically allowing the movement.

Next, a third modified example of the elastic member 16 is shown in FIG. 10A. Referring to FIG. 10A, the same members as those in the embodiment in FIG. 6 are marked with the same numerals or symbols, and their repetitive explanations are omitted. A cylindrical elastic member 162 is fixedly fitted in the holding member 162a, and the holding member 162a is fixedly fitted in the shaft support hole 3d of the bearing 3a. An inside diameter of the elastic member 162 is substantially equal to the outside diameter of the bearing support portion 2b, and is set to a dimension that makes the bearing support portion 2b smoothly slidable when the bearing support member 2b moves in the axial directions.

A multiplicity of grooves 162b are, as illustrated in FIG. 10B, formed along an axial direction on an inner peripheral surface of the elastic member 162, whereby the elastic member 162 is easy to be compressed from inside its inner peripheral surface. When the bearing support portion 2b moves in the meshing direction of the worm 2a, the bearing support portion 2b presses the inner peripheral surface (formed with the multiplicity of grooves 162b) of the elastic member 162 and thus compresses the elastic member 162 in this direction, thereby elastically allowing the movement.

The ring-shaped stopper 19 is fixedly fitted on the left end portion, as viewed in the Figure, of the bearing support portion 2b. The elastic member 162 permits the bearing support portion 2b to move in the axial direction (away from or towards the motor 10) but the stopper 19 restricts the movement in the axial direction.

As discussed above, according to the fourth embodiment of the first invention of the present invention, the motor-sided bearing has the elastic members disposed on both sides in the axial direction adjacently thereto, whereby the worm is slightly movable in the axial direction. Besides, the bearing on the distal side from the motor supports the rotary shaft (the worm shaft) through the elastic member, and this rotary shaft is slightly movable in the meshing direction of the worm. Therefore, with the simple construction, the backlash can be completely eliminated. Further, when the force is applied to the rotary shaft, the rotary shaft moves in the axial directions within the limit of the elasticity of the elastic member, with the result that the worm and the gear portion of the worm wheel mesh with each other in the proper positions to absorb the impact. It is therefore possible to reduce the tooth-butting noises without any decline of a transmission performance of an auxiliary steering force.

Moreover, in the fourth embodiment of the first invention, at least the half, in the axial direction, of the spline connecting portion between the rotary shaft and the motor shaft is positioned within the shaft support hole of the bearing. Therefore, even when the rotary shaft slightly moves in the meshing direction of the worm, as the motor-sided bearing serves as the fulcrum, the rotary shaft can move in the axial direction without wresting the spline connecting portion.

Furthermore, the pre-load force of the worm can be adjusted depending on the material and the configuration of the elastic member, and hence dimensional accuracies are not excessively required of the rotary shaft and the bearing as well, thereby facilitating the dimensional control.

Figure 11:
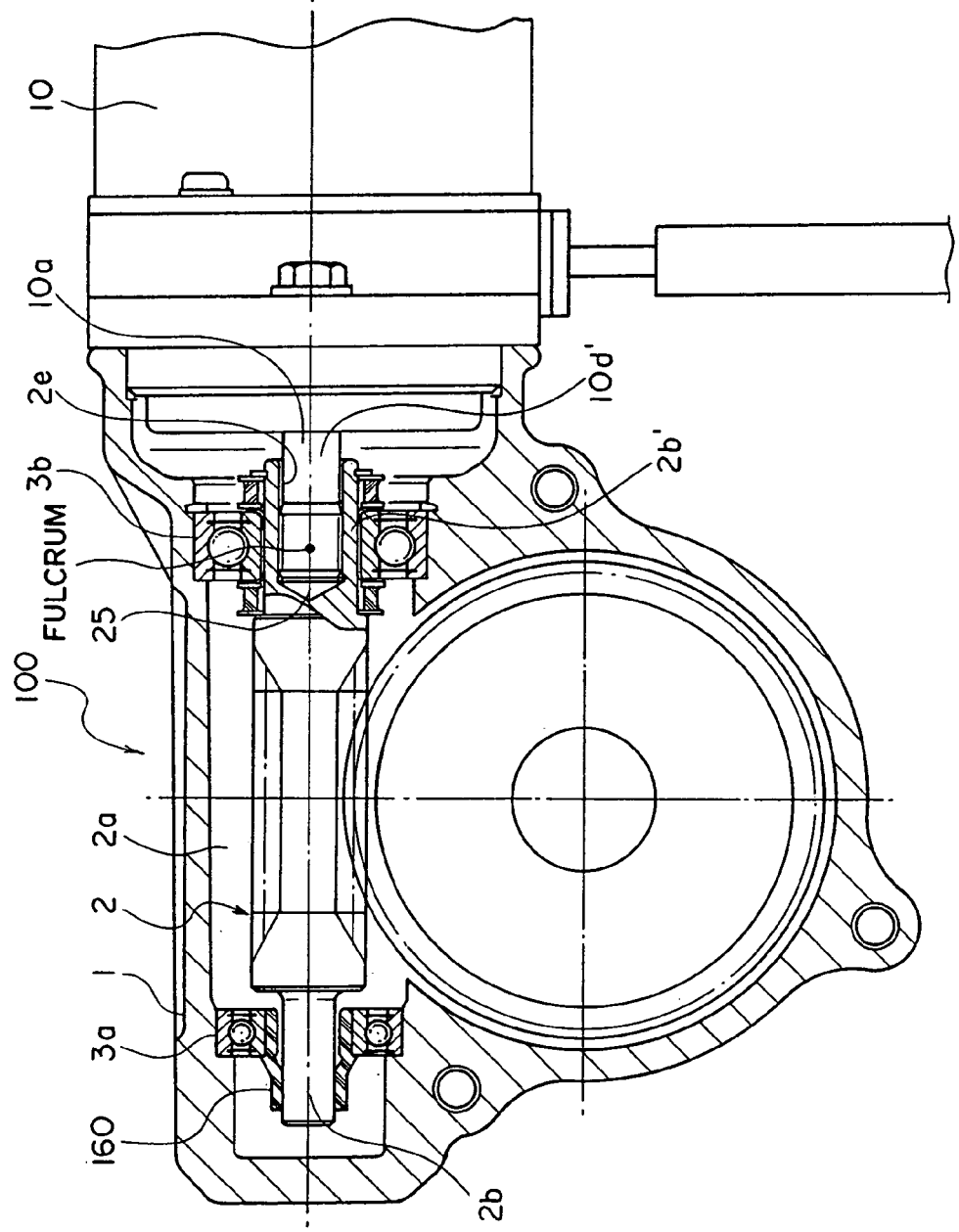
FIG. 11 is a sectional view of an electric power steering apparatus, showing a fifth embodiment of the first invention of the present invention.
Figure 12:
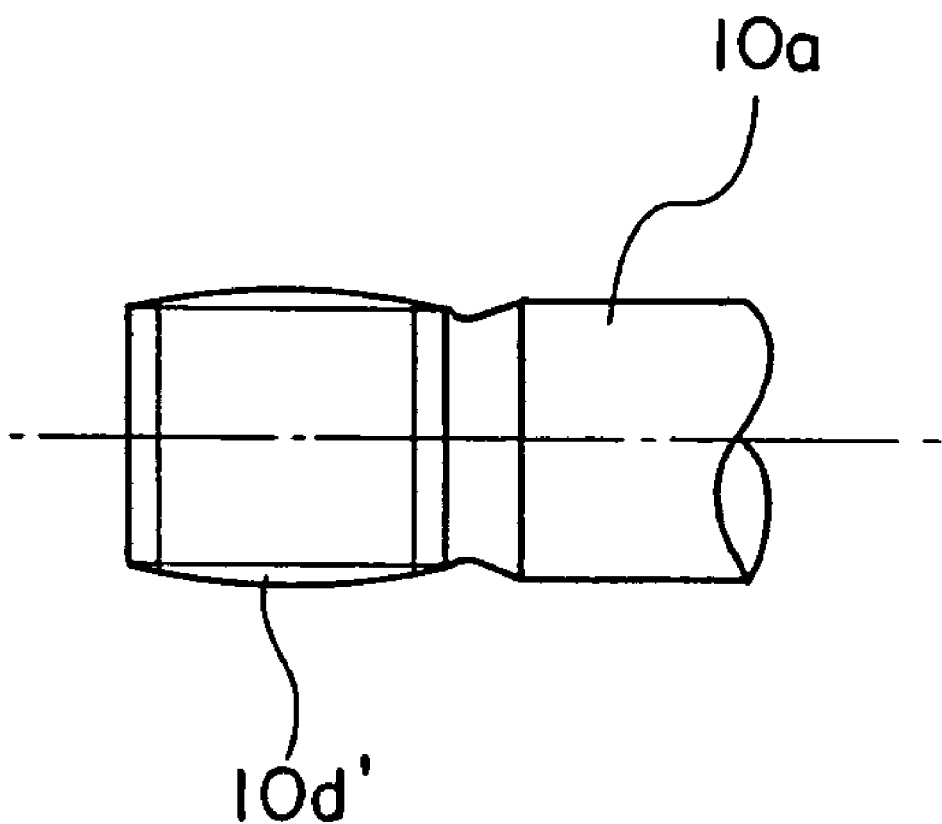
FIG. 12 is a partial side view of a male spline portion of a motor shaft.

Next, a fifth embodiment of the first invention of the present invention will be explained in conjunction with FIGS. 11 and 12. FIG. 11 is a sectional view of the electric power steering apparatus, showing the fifth embodiment of the first invention. FIG. 12 is a partial side view of the male spline portion of the motor shaft.

In the fifth embodiment of the first invention, the components having the same structures as those in the aforementioned embodiments of the first invention are shown with the same numerals or symbols.

In the electric power steering apparatus 100 in FIG. 11, the electric motor 10, the ball bearings 3a, 3b for rotatably supporting the worm shaft 2 defined as the rotary shaft, the output shaft 5 of the worm wheel 4, etc., are disposed or fixed in predetermined positions in the housing 1.

The worm shaft 2 is constructed of the worm 2a formed on the central portion thereof, and the bearing support portions 2b, 2b' formed on both sides of this worm 2a. A relationship between the bearing portion 2b' proximal to the electric motor 10 and the motor shaft 10a of the electric motor 10 is similar to what is shown in FIG. 7. Namely, the bearing portion 2b' is formed with the connecting hole 2f opened toward the motor side and having the female spline portion 2e. An end of the motor shaft 10a is formed with a male spline portion 10d'. The female spline portion 2e is spline-connected to the male spline portion 10d'.

In the fifth embodiment of the first invention, the male spline portion 10d' of the motor shaft 10a takes, as illustrated in FIG. 12, a drum-like shape whose diameter is small at both of its ends with a narrow key width but is large at its central portion in the axial direction. The male spline portion 10d' is fitted into the bearing portion 2b' of the worm shaft at a central portion of the ball bearing 3b. A diameter of the female spline portion of the bearing portion 2b' remains unchanged in the axial direction.

In the fifth embodiment of the first invention, a structure between the ball bearing 3a on the distal side from the motor 10, the bearing support portion 2e of the worm shaft 2 and the cylindrical elastic member 160 interposed therebetween, is the same as what is shown in FIG. 8.

In the fifth embodiment of the first invention, structures other than the above-mentioned are the same as those in the embodiments discussed above, and hence their repetitive explanations are omitted.

In the fifth embodiment of the first invention, when the electric motor 10 generates an assist torque, the worm receives the force in such a direction as to get away from the wheel. At this time, the worm is tilted about the central portion, serving as a fulcrum, of the bearing on the proximal side to the motor, however, the spline portions do not interfere with each other, and neither the operating force nor a feeling at steering neutral time is deteriorated. Further, in the case where the worm moves in the axial direction, the interference between the spline portions does not occur.

Moreover, the end portion of the male spline portion 10d' of the motor shaft 10a is small of its diameter, and hence when the apparatus is assembled, the male spline portion 10d' is easy to fit into the male spline portion 2e, thereby improving the operability.

Next, embodiments of a second invention of the present invention will be discussed with reference to the drawings.

Figure 14A:
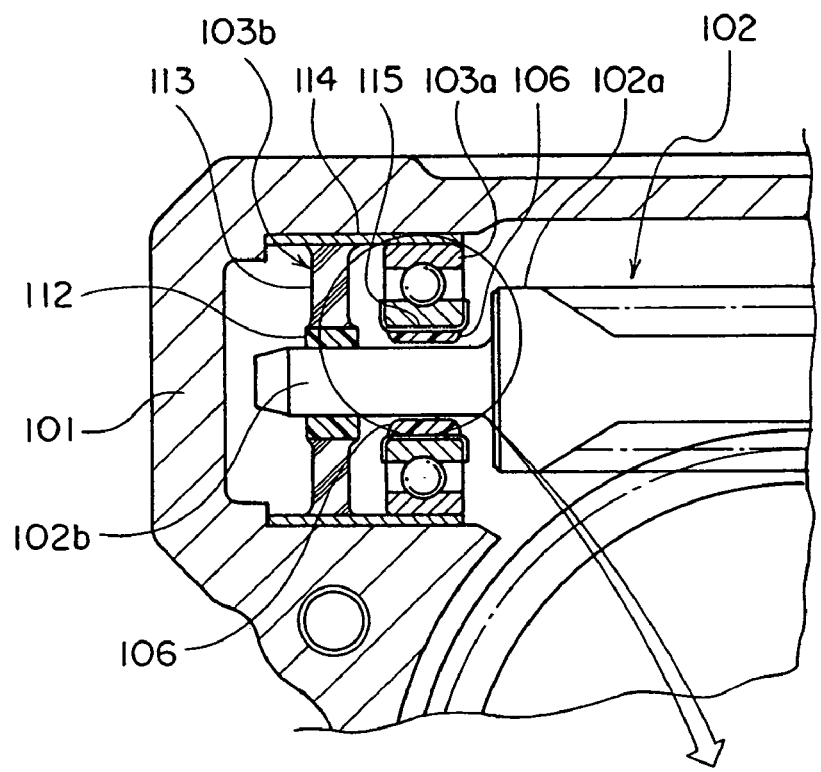
FIG. 14A is a partial sectional view of an electric power steering apparatus, showing a second embodiment of the second invention of the present invention.
Figure 14B:
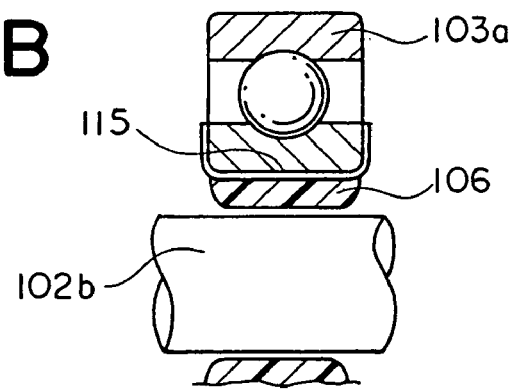
FIG. 14B is an enlarged view of a principal portion in FIG. 14A.
Figure 15A:
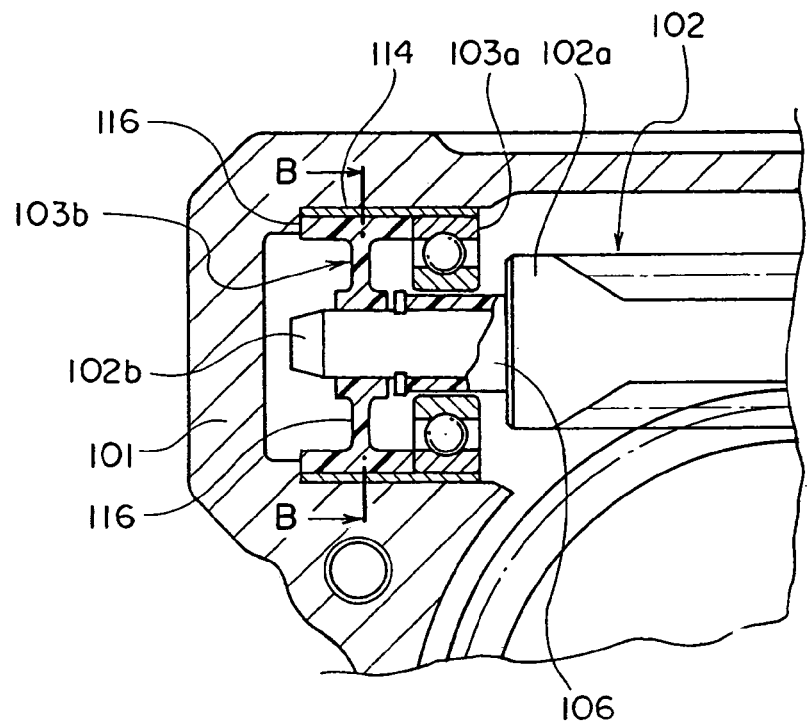
FIG. 15A is a partial sectional view of the electric power steering apparatus, showing a third embodiment of the second invention of the present invention.
Figure 15B:
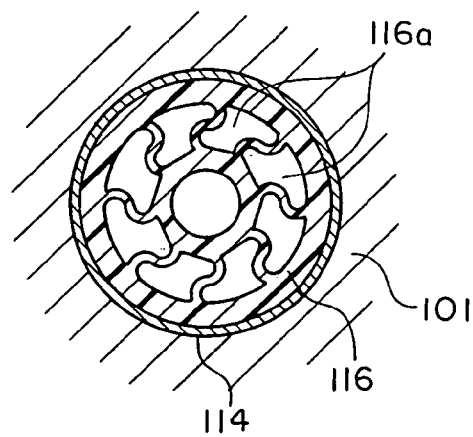
FIG. 15B is a sectional view taken along the line B—B in FIG. 15A.
Figure 16A:
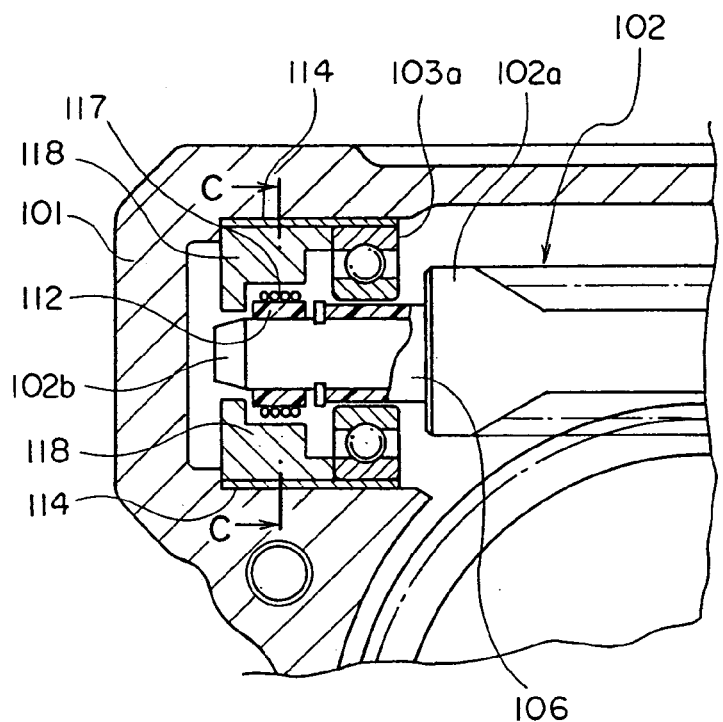
FIG. 16A is a partial sectional view of an electric power steering apparatus, showing a fourth embodiment of the second invention of the present invention.
Figure 16B:
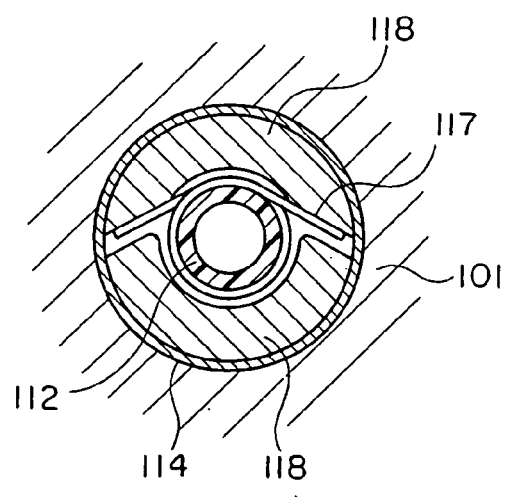
FIG. 16B is a sectional view taken along the line C—C in FIG. 16A.
Figure 17A:
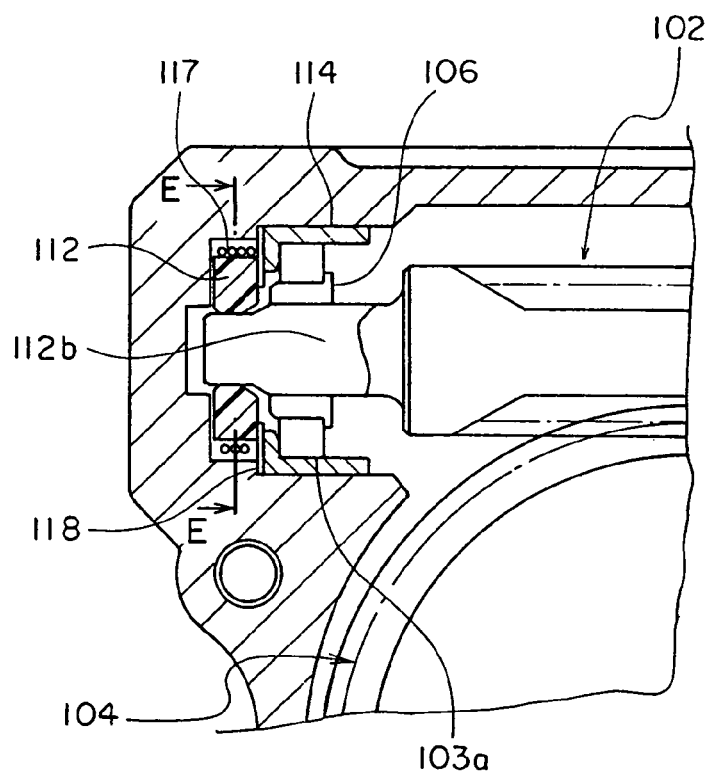
FIG. 17A is a partial sectional view of an electric power steering apparatus, showing a fifth embodiment of the second invention of the present invention.
Figure 17B:
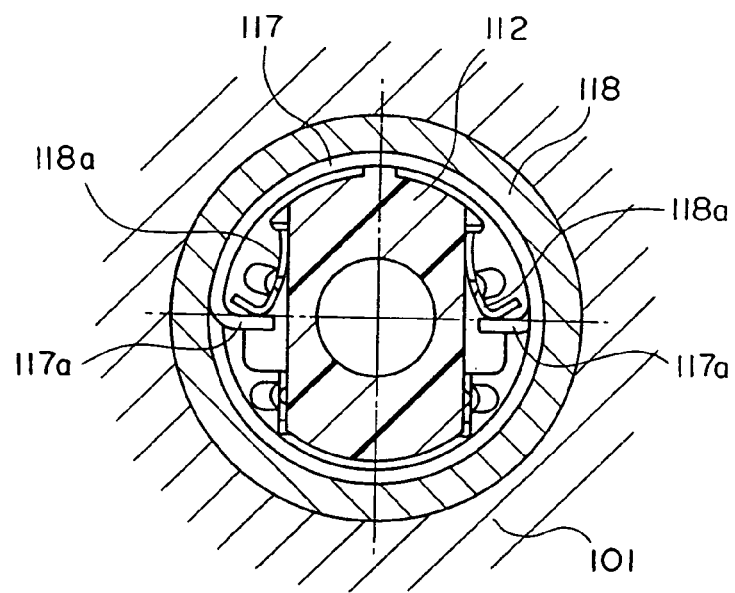
FIG. 17B is a sectional view taken along the line E—E in FIG. 17A.
Figure 18A:
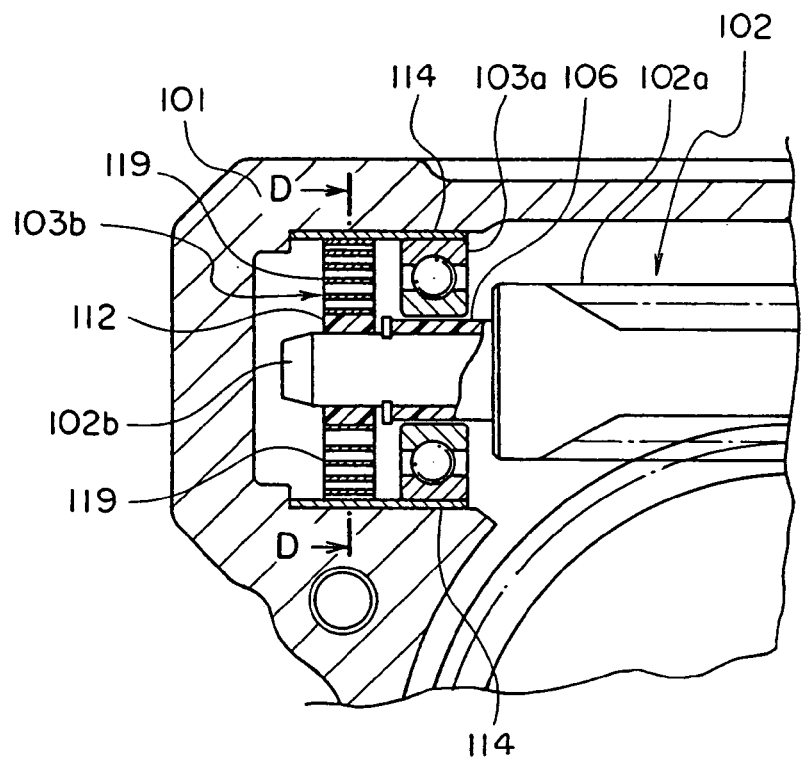
FIG. 18A is a partial sectional view of an electric power steering apparatus, showing a sixth embodiment of the second invention of the present invention.
Figure 18B:
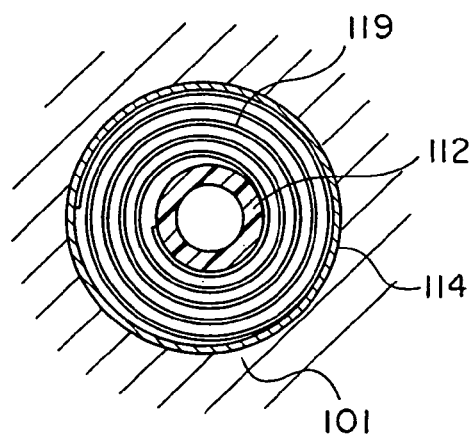
FIG. 18B is a sectional view taken along the line D—D in FIG. 18A.

FIG. 13A is a sectional view of the electric power steering apparatus, showing a first embodiment of the second invention of the present invention. FIG. 13B is a sectional view taken along the line A—A in FIG. 13A. FIG. 14A is a sectional view of the electric power steering apparatus, showing a second embodiment of the second invention of the present invention. FIG. 14B is an enlarged view of a principal portion in FIG. 14A. FIG. 15A is a sectional view of the electric power steering apparatus, showing a third embodiment of the second invention of the present invention. FIG. 15B is a sectional view taken along the line B—B in FIG. 15A. FIG. 16A is a sectional view of the electric power steering apparatus, showing a fourth embodiment of the second invention of the present invention. FIG. 16B is a sectional view taken along the line C—C in FIG. 16A. FIG. 17A is a sectional view of the electric power steering apparatus, showing a fifth embodiment of the second invention of the present invention. FIG. 17B is a sectional view taken along the line E—E in FIG. 17A. FIG. 18A is a sectional view of the electric power steering apparatus, showing a sixth embodiment of the second invention of the present invention. FIG. 18B is a sectional view taken along the line D—D in FIG. 18A.

In the electric power steering apparatus 100 in FIGS. 13A and 13B showing the first embodiment of the second invention of the present invention, an electric motor 101, ball bearings 103a, 103c for rotatably supporting a worm shaft 102 defined as a rotary shaft, an elastic portion 103b, an output shaft 105 of a worm wheel 104, etc., are disposed or fixed in predetermined positions in a housing 101.

The worm shaft 102 is constructed of a worm 102a formed substantially on the central portion thereof, and bearing support portions 102b formed on both sides of the worm 102a. A cylindrical connecting member 108 is fixedly fitted on the bearing support portion 102b (the right side in the Figure) on the side of the ball bearing 103c proximal to the electric motor 110. A female spline portion 108a is formed substantially in a half, in the axial direction, of an inner peripheral surface of the connecting member 108. The connecting member 108 is fitted in a shaft support hole 103d (an inner peripheral surface of an inner ring) of the ball bearing 103c so that the connecting member 108 is movable in the axial directions.

On the other hand, a male spline portion 110b is provided on an end portion of the motor shaft 110a of the electric motor 110. This male spline portion 110b is loosely fitted in the female spline portion 108a of the connecting member 108, whereby the worm shaft 102 is spline-connected to the motor shaft 110a in a state of being movable in the axial directions but unmovable in the rotational direction. This spline connecting portion is set so that substantially a half of the connecting portion in the axial direction is positioned within the shaft support hole 103d of the bearing 103c. The connecting member 108 may be formed integrally with the worm 102a.

On the opposite side to the motor, the ball bearing 103a and an elastic portion 103b are disposed side by side in the axial direction. The bearing 103a has a function as a rolling bearing, and an outer ring thereof is fixedly fitted in a bearing ring 114 defined as a cylindrical bearing holding member fixedly fitted in the housing 101. A cylindrical buffer member 106 formed of a resin, etc., which is fixedly fitted on the bearing support portion 102b of the worm shaft 102, is loosely fitted in an inner ring of the bearing 103a.

The elastic portion 103b is constructed of a biasing member 112 having an inside diameter substantially equal to an outside diameter of the bearing support portion 102b and being formed of resin, and an elastic body 113 fixedly fitting therein the biasing member 112 and fitting rein, fixedly fitted in the bearing ring 114 and formed of a rubber, etc. A position in which the elastic body 113 receives therein the biasing member 112 is far eccentric in the meshing direction of the worm 102a. When incorporating the worm shaft 102 into the ball bearing 103a and the elastic portion 103b, however, the worm shaft 102 becomes substantially concentric with the bearing 103a, and hence the elastic body 113 deforms in a direction opposite to the meshing direction of the worm 102a, thereby producing a pre-load force in the meshing direction.

An outside diameter of the buffer member 106 is set slightly smaller than an inside diameter of the inner ring of the bearing 103a. Let ΔS be a displacement quantity of the worm 102a in the meshing direction for eliminating the backlash, and an outside diameter of the buffer member 106 is set to a dimension given by (an inner ring inside diameter −2·ΔS). This is a value of such a degree that the buffer member 106 is loosely fitted into the inner ring.

On the other hand, elastic members 107 each assuming substantially a ring-shape are disposed on both sides of the bearing 103c proximal to the electric motor 110 in the axial direction adjacently to the bearing 103c. These two elastic members 107, 107 are disposed in the form of each being held by two pieces of ring-shaped holding members 107a and 107b. The holding members 107a positioned away from the bearing 103c are each fixedly fitted on the connecting member 108. The holding members 107b abutting on the bearing 103c are fixed to the bearing 103b and provided along the connecting member 108 in a non-contact manner. The elastic member 107 elastically extends and shrinks in the axial directions as the connecting member 108 moves in the axial directions, thereby allowing the worm shaft 102 to move in the axial directions within the limit of the elasticity thereof.

The worm wheel 104 is fixedly fitted on the output shaft 105 extending in the direction orthogonal to the axial direction of the worm shaft 102. The output shaft 105 is so disposed as to be rotatably supported in a predetermined position of the housing 101 in a state of the worm wheel 104 meshing with the worm 102a. A gear portion 104a of the worm wheel 104 is formed of a resin.

As illustrated in FIG. 13A, in the meshing between the worm 102a and the worm wheel 104, let S (a+b=S) be a distance which is the sum of a working radius a of the worm 102a and a working radius b of the worm wheel 104, and the output shaft 105, the bearing 103c and the electric motor 110 are disposed in the housing 101 so that an axis-to-axis distance between the motor shaft 110a of the electric motor 110 and the output shaft 105 of the worm wheel 104 and an axis-to-axis distance between the bearing 103c and the output shaft 105 become S. In this embodiment, the distance S is set such as S=47.5 mm. It is effective that the displacement quantity ΔS of the worm 102a in the meshing direction for eliminating the backlash be set to an optimal value in a range of 0.1 mm through 0.5 mm.

In the construction described above, a position in which the biasing member 112 is fitted in the elastic body 113 of the elastic portion 103b, is eccentric in the meshing direction of the worm 102a, and hence, when assembling the worm shaft 102 into the bearing 103a, the elastic body 113 deforms to produce a pre-load force in the meshing direction of the worm 102a. Then, the worm 102a and the gear portion 104a of the worm wheel 104 mesh with each other without the backlash. Thus, the worm 102a is kept in the so-called floating state.

Particularly, a rate at which a volume of the elastic body 113 occupies the elastic portion 103b is taken large, whereby an initial eccentric quantity needed for generating the pre-load can be taken large and a spring constant of the elastic body 113 can be decreased. Therefore, even when a configuration of the worm 102a might change due to a scatter in working accuracy and an abrasion of the gear, it is feasible to stably maintain a fixed pre-load force and to effectively prevent the tooth-butting noises of the gears.

This pre-load force generates the friction to some extent when the worm 102a meshes with the worm wheel 104, however, a thickness and a rigidity of the elastic body 113 are set so that a resistance force thereof does not become excessively large enough to cause a hindrance to a gear performance or to such a degree that a deviation in meshing does not occur due to an input of vibrations applied from tires. The rigidity of this elastic body 113 can be set depending on hardness and a configuration of the rubber without any restriction.

Further, the worm shaft 102 is movable in the axial directions, and hence, when a force is applied from the tire, the worm shaft 102 moves in the axial directions within a limit of elasticity of the elastic member 107, whereby the worm 102a and the gear portion 104a of the worm wheel 104 mesh with each other in proper positions to make it possible to absorb an impact.

In the portion of the ball bearing 103a, even in a case where a pressure is exerted on the buffer member 106 due to an abrupt displacement of the worm 102a in the meshing direction thereof, the buffer member 106 absorbs vibrations, thereby preventing an emission of noises of collision. Further, the buffer member 106 is formed of the resin and is therefore effective in reducing a friction caused when the worm shaft 102 moves in the axial directions.

Moreover, in the ball bearing 103a, the minute gap ΔS is provided between the inner ring and the buffer member 106 of the worm shaft 102, and hence there is absorbed a change in the axis-to-axis distance between the worm shaft 102 and the output shaft 105 due to the scatter in the working accuracy and to the meshing, whereby the stable operation can be ensured.

Further, the ball bearing 103a receives a load and a rotational torque acting in the meshing direction of the worm 102a, which are generated when driving (when assisting) the apparatus, and controls the displacement of the worm 102a. Therefore, neither a large distortion nor load occurs in the elastic body 113 of the elastic portion 103b, thereby a durability of the elastic body 113 to be improved.

Thus, the fitting position of the bearing support portion 102b into the elastic body 113 of the elastic portion 103b is set eccentric, the outside diameter of the buffer member 106 is set comparatively smaller than the inside diameter of the inner ring of the bearing 103a, and the elastic member 107 is provided between the worm shaft 102 and the bearing 103c, which all cooperate to enable a pre-load mechanism to be easily structured, the backlash to be completely eliminated, the impact to be absorbed and the tooth-butting noises (rattle noises) to be restrained.

Next, a second embodiment of the second invention of the present invention will be explained referring to FIGS. 14A and 14B. The second embodiment of the second invention is substantially the same as the first embodiment of the second invention discussed above, wherein the same members are marked with the same numerals or symbols, and their repetitive explanations are omitted. A different point is that the buffer member 106 is fixedly fitted in the inner ring of the first bearing 103a. The buffer member 106 is bonded to a cylinder 115 whose wall is thin, and the cylinder 115 is fixedly fitted in the inner ring. In this construction also, the same effects as the first embodiment of the second invention exhibits can be expected. Further, this buffer member 106 may also be fixed to the inner ring through no intermediary of the cylinder 115.

Subsequently, a third embodiment of the second invention of the present invention will be described with reference to FIGS. 15A and 15B. The third embodiment of the second invention is substantially the same as the first embodiment of the second invention discussed above, wherein the same members are marked with the same numerals or symbols, and their repetitive descriptions are omitted. A different point is that the rubber-made elastic body 113 of the elastic portion 103b is replaced with a resin-made elastic body 116, and, as illustrated in FIG. 15B, a plurality of holes 116a are formed along a periphery of a biasing member 112.

In this construction, the elastic body 116 functions as an elastic body capable of elastically deforming in the meshing direction of the worm 102a owing to the plurality of holes 116a. The third embodiment can be also expected to exhibit the same effects as those in the first embodiment of the second invention, and may require a less number of parts, which contributes to reduce the costs.

Next, a fourth embodiment of the second invention of the present invention will be discussed with reference to FIGS. 16A and 16B. The fourth embodiment of the second invention is substantially the same as the first embodiment of the second invention discussed above, wherein the same members are marked with the same numerals or symbols, and their repetitive descriptions are omitted. A different point is that a torsion spring 117 is adopted as a substitute for the elastic body 113 of the elastic portion 103b. In this case, the elastic portion 103b is constructed of a biasing member 112 for rotatably supporting the bearing support portion 102b of the worm shaft 102, the torsion spring 117 wound on an outer peripheral portion of the biasing member 112, and a latching member 118 that latches both side ends of the torsion spring 117 in order to support the biasing member 112 in a position eccentric in the meshing direction of the worm 102a and is fixedly fitted in the bearing ring 114. As shown in FIG. 16B, the torsion spring 117 is open at its both side ends in an initial state but resiliently closes when incorporated into the latching member 118, and a biasing force generated at this time produces a pre-load force acting in the meshing direction in the worm 102a. In this construction also, the same effects as the first embodiment of the second invention has can be expected.

Next, a fifth embodiment of the second invention of the present invention will be explained referring to FIGS. 17A and 17B. The fifth embodiment of the second invention is substantially the same as the first embodiment of the second invention discussed above, wherein the same members are marked with the same numerals or symbols, and their repetitive descriptions are omitted. A different point is that the torsion spring 117 is adopted as a substitute for the elastic body 113 of the elastic portion 103b. In this case, the elastic portion 103b is constructed of the biasing member 112 rotatably supporting the bearing support portion 102b of the worm shaft 102, the torsion spring 117 wound on the outer peripheral portion of the biasing member 112, and the latching member 118 that latches both ends of the torsion spring 117 in order to support the biasing member 112 in a position eccentric in the meshing direction of the worm 102a and is fixedly fitted in the bearing ring 114. The biasing member 112 is fitted at the its center thereof on the worm shaft 102b and generates a pre-load with respect to the worm 102a by dint of a rewinding force of the torsion spring 117 wound on along the outer periphery thereof concentrically with a hole thereof. A contact portion between the biasing member 112 and the torsion spring 117 is opposed to the wheel 104 and is well short for an inner periphery of the torsion spring 117, the structure being such that the pre-load generated by the torsion spring 117 can be efficiently transferred to the biasing member 112. Further, the latching member 118 is fixedly fitted in the housing 101 and fixed by the bearing ring 114. The latching member 118 may be formed either by press working or of a resin, etc.

As illustrated in FIG. 17B, the torsion spring 117 has two pieces of hooks 117a provided at both ends and disposed respectively in positions that are shifted by 180° in phase with respect to a winding center of the torsion spring 117 in the initial state, wherein these hooks 117a are latched by projections of the latching member 118. Moreover, the torsion spring 117 is given a torsional torque beforehand. With this contrivance, the biasing member 112 is, before assembling the worm 102a, held by the projections 118a of the latching members in positions slightly shifted with respect to the elastic portion, and the biasing member 112 is displaced by assembling the worm 102a with the result that the pre-load force is to be produced for the worm 102a. Therefore, any processes specializing in adjusting and in giving the pre-load are not required, and a built-in characteristic is improved. Moreover, the predetermined pre-load force can be ensured even by setting the spring constant comparatively low. In this construction also, the same effects as those in the first embodiment of the second invention can be expected.

Moreover, a sixth embodiment of the second invention of the present invention will be explained with reference to FIGS. 18A and 18B. The sixth embodiment of the second invention is substantially the same as the first embodiment of the second invention discussed above, wherein the same members are marked with the same numerals or symbols, and their repetitive descriptions are omitted. A different point is that a spiral spring 119 is adopted as a substitute for the elastic body 113 of the elastic portion 103b. One end of the spiral spring 119 is fixed to the outer peripheral portion of the biasing member 112 rotatably supporting the bearing support portion 102b of the worm shaft 102, and the other end thereof is fixed to the bearing ring 114. The biasing member 112 is eccentric in the meshing direction of the worm 102a with respect to the axis of the bearing ring 114, and, when assembling the worm shaft 102 into the ball bearing 103a, the spiral spring 119 deforms to produce the pre-load acting in the meshing direction in the worm 102a. In this construction also, same effects as those in the first embodiment of the second invention can be expected.

INDUSTRIAL APPLICABILITY

As described above, according to the first invention of the present invention, the motor is installed with respect to the output shaft in such a position that the length which is the sum of the working radius of the worm and the working radius of the worm wheel becomes the axis-to-axis distance between the output shaft and the motor shaft. The bearing is installed with respect to the output shaft in such a position that the axis-to-axis distance between the shaft support hole and the output shaft becomes slightly smaller than the axis-to-axis distance between the output shaft and the motor shaft. The elastic member having the predetermined elasticity and thickness is interposed between the inner peripheral surface of the shaft support hole of the bearing and the rotary shaft. The outside diameter of the portion of the rotary shaft on which the elastic member is fitted, is set smaller than the inside diameter of the shaft support hole to such a degree that the elastic member gives the proper biasing force towards the worm wheel of the worm. Therefore, with the simple construction, the backlash can be eliminated, and the tooth-butting noises can be reduced without any decline of the transmitting performance of the auxiliary steering force.

Further, the pre-load force can be adjusted based on the material and the configuration of the elastic member, and hence the dimensional accuracies are not excessively required of the rotary shaft and the bearing as well, thereby facilitating the dimensional control.

Moreover, according to the second invention of the present invention, with respect to the motor-sided bearing, the elastic members are disposed on both sides in the axial direction thereof and adjacently thereto, and the worm is set slightly movable in the axial directions. Besides, the bearing on the distal side from the motor is the rolling bearing, and the elastic portion for biasing the worm in the meshing direction is provided on the rotary shaft. The outer ring of the bearing is fixedly fitted in the cylindrical bearing support member fixedly fitted in the housing, and the inner ring of this bearing loosely receives therein the cylindrical buffer member fixedly fitted on the rotary shaft. The elastic portion is constructed of the biasing member for rotatably supporting the rotary shaft and of the elastic body receiving therein this biasing member in the position that is eccentric in the meshing direction of the worm with respect to the axis of the bearing, this elastic body being fixed in the vicinity of the bearing support member. Therefore, the worm has the pre-load force produced in the meshing direction thereof, and, with the simple construction, the backlash can be eliminated completely.

Particularly, the rate at which the volume of the elastic body occupies the elastic portion is taken large, whereby the initial eccentric quantity needed for generating the pre-load can be taken large and the spring constant of the elastic body can be decreased. Therefore, even when the configuration of the worm might change due to the scatter in working accuracy and the abrasion of the gear, it is feasible to stably maintain the fixed pre-load force and to effectively prevent the tooth-butting noises of the gears.

Further, when the force is applied to the rotary shaft, the rotary shaft moves in the axial directions within the limit of the elasticity of the elastic member, with the result that the worm and the gear portion of the worm wheel mesh with each other in the proper positions to absorb the impact. It is therefore possible to reduce the tooth-butting noises without any decline of the transmission performance of the auxiliary steering force.

Moreover, the bearing receives the load and the rotational torque acting in the meshing direction of the worm, which are generated when driving the apparatus, thus controlling the displacement of the worm. Therefore, neither the large distortion nor load occurs in the elastic body of the elastic portion, which leads to an improvement of a lifetime of the elastic body.

Furthermore, according to the third invention of the present invention, the electric power steering apparatus includes the housing, the motor attached to this housing and transmitting the auxiliary steering force to the rotary shaft through the motor shaft, the worm formed on or fitted on this rotary shaft and having the gear portion formed of the metal or the resin, the rolling bearings provided in the housing, disposed respectively in the positions on both sides of the worm and rotatably supporting the rotary shaft, the output shaft transmitting the steering force for steering an axle and rotatably supported in the predetermined position of the housing, and the worm wheel formed on or fitted on the output shaft in a way that meshes with the worm and having the gear portion formed of the resin, wherein the pre-load mechanism for applying the pre-load acting towards the worm wheel is provided at the shaft side end portion, distal from the motor, of the rotary shaft. It is possible to provide the thus simply-constructed electric power steering apparatus capable of eliminating an existence of the backlash and reducing the tooth-butting noises without any decline of the power transmitting performance.

What is claimed is:

1. An electric power steering apparatus comprising:
   a housing;
   a motor attached to said housing and transmitting an auxiliary steering force to a rotary shaft through a motor shaft;
   a worm formed on or fitted on said rotary shaft and having a gear portion formed of a metal or a resin;
   bearings provided in said housing, disposed respectively in positions on both sides of said worm and rotatably supporting said rotary shaft, said bearings including a motor-side bearing and a second bearing which is positioned away from said motor;
   an output shaft transmitting a steering force for steering an axle and rotatably supported in a predetermined position of said housing; and
   a worm wheel formed on or fitted on said output shaft in a way that meshes with said worm and having a gear portion formed of a resin,
   said motor including a worm gear mechanism installed in such a position that a length which is the sum of a working radius of said worm and a working radius of said worm wheel becomes an axis-to-axis distance between said output shaft and said motor shaft,
   wherein elastic members are disposed on both sides, axially, of said motor-side bearing and adjacent to said motor-side bearing, said rotary shaft being set slightly axially movable,
   said second bearing is a rolling bearing, an elastic portion being provided on said rotary shaft and biasing said worm in a meshing direction in parallel with said rolling bearing,
   an outer ring of said rolling bearing is fixedly fitted in a cylindrical bearing holding member fixedly fitted in said housing, an inner ring of said rolling bearing loosely receiving therein a cylindrical buffer member fixedly fitted on said rotary shaft,
   said elastic portion includes a biasing member rotatably supporting said rotary shaft and an elastic body receiving therein said biasing member in a position eccentric in the meshing direction of said worm with respect to an axis of said rolling bearing, and fixed in a vicinity of said bearing holding member,
   wherein at least a half, in an axial direction, of a spline connecting portion between said rotary shaft and said motor shaft is so set as to be positioned within a shaft support hole of said motor-side bearing.

2. An electric power staring apparatus according to claim 1, wherein an elastic member associated with said motor-side bearing, or said rotary shaft in the vicinity of the second bearing, or both, is or are provided with a stopper for controlling a quantity of axial movement of said rotary shaft.

3. An electric power staring apparatus according to claim 1, wherein said rotary shaft and said motor shaft are spline-connected to each other, and said rotary shaft is so formed as to be swayable about the spline connecting portion serving as a fulcrum.

4. An electric power staring apparatus according to claim 3, wherein said motor shaft is formed with a male spline portion, said rotary shaft is formed with a female spline portion, and
   said male spline portion is formed in a drum shape so that its diameter is small at both side ends thereof in axial directions and is large at a central portion thereof.

* * * * *